(12) United States Patent
Lockhart et al.

(10) Patent No.: US 9,300,618 B2
(45) Date of Patent: Mar. 29, 2016

(54) CUSTOMIZING PERISHABLE CONTENT OF A MEDIA CHANNEL

(71) Applicant: Clear Channel Management Services, Inc., San Antonio, TX (US)

(72) Inventors: Kevin R. Lockhart, Ogallala, NE (US); Richard D. Wooden, San Antonio, TX (US); Jeffrey D. Zigler, Omaha, NE (US); Jacqueline J. Lockhart, Poway, CA (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 0 days.

(21) Appl. No.: 14/269,447

(22) Filed: May 5, 2014

(65) Prior Publication Data

US 2014/0244390 A1 Aug. 28, 2014

Related U.S. Application Data

(62) Division of application No. 12/229,515, filed on Aug. 22, 2008, now Pat. No. 8,719,349.

(60) Provisional application No. 60/957,955, filed on Aug. 24, 2007.

(51) Int. Cl.
*H04L 12/58* (2006.01)
*H04L 29/08* (2006.01)
(Continued)

(52) U.S. Cl.
CPC .......... *H04L 51/22* (2013.01); *G06F 17/30017* (2013.01); *G06F 17/30749* (2013.01); *G06F 17/30761* (2013.01); *G06F 17/30772* (2013.01); *G06Q 30/0207* (2013.01); *G06Q 30/0255* (2013.01); *H04L 67/02* (2013.01); *H04L 67/1095* (2013.01)

(58) Field of Classification Search
CPC .................... G06F 17/30017; G06F 17/30749; G06F 17/30772; G06F 17/30761; H04L 67/02; G06Q 30/0207
See application file for complete search history.

(56) References Cited

U.S. PATENT DOCUMENTS

| 4,788,675 A | 11/1988 | Jones et al. |
| 5,283,639 A | 2/1994 | Esch et al. |
| 5,616,876 A | 4/1997 | Cluts |

(Continued)

OTHER PUBLICATIONS

International Search Authority; International Search Report and Written Opinion; PCT/US08/10002; Nov. 18, 2008; 16 pgs.

*Primary Examiner* — Ebrahim Golabbakhsh
(74) *Attorney, Agent, or Firm* — Garlick & Markison; Edward J. Marshall

(57) ABSTRACT

A user can specify particular news weather, traffic, or other perishable content received on a particular Internet radio station or other media channel. The user can customize the station so that wherever the user is currently located, he can receive perishable content related to a preferred geographic location or other category. In some embodiments, a user can specify that a customized station plays local news from one city at the top of the hour, traffic from another city at 10 minutes past the hour, and music or other content at other times. The user can also customize the station to select the perishable content, or other original content, from the personal libraries of specified users. Thus, a user can customize not only the genre of content or select a particular local station, but can also modify the perishable content provided by the customized station.

20 Claims, 25 Drawing Sheets

(51) Int. Cl.
*G06F 17/30* (2006.01)
*G06Q 30/02* (2012.01)

(56) References Cited

U.S. PATENT DOCUMENTS

| | | |
|---|---|---|
| 5,699,089 A | 12/1997 | Murray |
| 5,819,160 A | 10/1998 | Foladare et al. |
| 5,953,005 A | 9/1999 | Liu |
| 6,026,368 A | 2/2000 | Brown et al. |
| 6,122,658 A | 9/2000 | Chaddha |
| 6,134,431 A | 10/2000 | Matsumoto et al. |
| 6,169,989 B1 | 1/2001 | Eichstaedt et al. |
| 6,177,931 B1 | 1/2001 | Alexander et al. |
| 6,189,008 B1 | 2/2001 | Easty et al. |
| 6,192,340 B1 * | 2/2001 | Abecassis ............... 704/270 |
| 6,198,906 B1 | 3/2001 | Boetje et al. |
| 6,230,205 B1 | 5/2001 | Garrity et al. |
| 6,234,182 B1 | 5/2001 | Berglund |
| 6,236,991 B1 | 5/2001 | Frauenhofer et al. |
| 6,243,725 B1 | 6/2001 | Hempleman et al. |
| 6,275,496 B1 | 8/2001 | Burns et al. |
| 6,278,976 B1 | 8/2001 | Kochian |
| 6,300,880 B1 | 10/2001 | Sitnik |
| 6,324,182 B1 | 11/2001 | Burns et al. |
| 6,341,316 B1 | 1/2002 | Kloba et al. |
| 6,345,256 B1 | 2/2002 | Milsted et al. |
| 6,381,651 B1 | 4/2002 | Nishio et al. |
| 6,385,596 B1 | 5/2002 | Wiser et al. |
| 6,389,469 B1 | 5/2002 | Vekslar et al. |
| 6,389,538 B1 | 5/2002 | Gruse et al. |
| 6,421,717 B1 | 7/2002 | Kloba et al. |
| 6,434,621 B1 | 8/2002 | Pezzillo et al. |
| 6,434,747 B1 | 8/2002 | Khoo et al. |
| 6,441,832 B1 | 8/2002 | Tao et al. |
| 6,452,083 B2 | 9/2002 | Pachet et al. |
| 6,486,892 B1 | 11/2002 | Stern |
| 6,490,587 B2 | 12/2002 | Easty et al. |
| 6,496,802 B1 | 12/2002 | van Zoest et al. |
| 6,526,411 B1 | 2/2003 | Ward |
| 6,534,700 B2 | 3/2003 | Cliff |
| 6,553,412 B1 | 4/2003 | Kloba et al. |
| 6,574,660 B1 | 6/2003 | Pashupathy et al. |
| 6,587,127 B1 | 7/2003 | Leeke et al. |
| 6,605,121 B1 | 8/2003 | Roderick |
| 6,609,105 B2 | 8/2003 | Van Zoest et al. |
| 6,657,116 B1 | 12/2003 | Gunnerson |
| 6,662,231 B1 | 12/2003 | Drosset et al. |
| 6,671,715 B1 | 12/2003 | Langseth et al. |
| 6,674,994 B1 | 1/2004 | Fell et al. |
| 6,686,531 B1 | 2/2004 | Pennock et al. |
| 6,701,315 B1 | 3/2004 | Austin |
| 6,704,576 B1 | 3/2004 | Brachman et al. |
| 6,721,955 B2 | 4/2004 | Khoo et al. |
| 6,728,729 B1 | 4/2004 | Jawa et al. |
| 6,735,628 B2 | 5/2004 | Eyal et al. |
| 6,738,635 B1 | 5/2004 | Lewis et al. |
| 6,745,237 B1 | 6/2004 | Garrity et al. |
| 6,757,691 B1 | 6/2004 | Welsh et al. |
| 6,760,429 B1 | 7/2004 | Hung et al. |
| 6,760,916 B2 | 7/2004 | Holtz et al. |
| 6,763,345 B1 | 7/2004 | Hempleman et al. |
| 6,791,904 B1 | 9/2004 | Herron et al. |
| 6,792,469 B1 | 9/2004 | Callahan et al. |
| 6,807,542 B2 | 10/2004 | Bantz et al. |
| 6,832,373 B2 | 12/2004 | O'Neill |
| 6,839,680 B1 | 1/2005 | Liu et al. |
| 6,839,744 B1 | 1/2005 | Kloba et al. |
| 6,859,838 B1 | 2/2005 | Puranik et al. |
| 6,865,600 B1 | 3/2005 | Brydon et al. |
| 6,868,403 B1 | 3/2005 | Wiser et al. |
| 6,868,440 B1 | 3/2005 | Gupta et al. |
| 6,876,901 B2 | 4/2005 | DiLorenzo |
| 6,895,406 B2 | 5/2005 | Fables et al. |
| 6,910,064 B1 | 6/2005 | Astarabadi et al. |
| 6,910,220 B2 | 6/2005 | Hickey et al. |
| 6,912,517 B2 | 6/2005 | Agnihotri et al. |
| 6,922,779 B1 | 7/2005 | Lapstun et al. |
| 6,925,489 B1 | 8/2005 | Curtin |
| 6,925,495 B2 | 8/2005 | Hegde et al. |
| 6,931,399 B2 | 8/2005 | Cheng et al. |
| 6,933,433 B1 | 8/2005 | Porteus et al. |
| 6,934,697 B1 | 8/2005 | Warren |
| 6,938,209 B2 | 8/2005 | Ogawa et al. |
| 6,944,585 B1 | 9/2005 | Pawson |
| 6,947,705 B2 | 9/2005 | Tsuchiuchi |
| 6,950,804 B2 | 9/2005 | Strietzel |
| 6,954,763 B2 | 10/2005 | Nunome et al. |
| 6,957,041 B2 | 10/2005 | Christensen et al. |
| 6,959,288 B1 | 10/2005 | Medina et al. |
| 6,961,758 B2 | 11/2005 | Krishnan |
| 6,963,898 B2 | 11/2005 | Yoshimine et al. |
| 6,964,061 B2 | 11/2005 | Cragun et al. |
| 6,965,770 B2 | 11/2005 | Walsh et al. |
| 6,970,915 B1 | 11/2005 | Partovi et al. |
| 6,976,028 B2 | 12/2005 | Fenton et al. |
| 6,983,371 B1 | 1/2006 | Hurtado et al. |
| 6,990,497 B2 | 1/2006 | O'Rourke et al. |
| 6,993,290 B1 | 1/2006 | Gebis et al. |
| 6,993,536 B2 | 1/2006 | Yamanaka |
| 6,993,570 B1 | 1/2006 | Irani |
| 6,996,390 B2 | 2/2006 | Herley et al. |
| 7,013,290 B2 | 3/2006 | Ananian |
| 7,017,120 B2 | 3/2006 | Shnier |
| 7,020,637 B2 | 3/2006 | Bratton |
| 7,020,704 B1 | 3/2006 | Lipscomb et al. |
| 7,028,082 B1 | 4/2006 | Rosenberg et al. |
| 7,028,252 B1 | 4/2006 | Baru et al. |
| 7,039,594 B1 | 5/2006 | Gersting |
| 7,058,694 B1 * | 6/2006 | De Bonet et al. ............ 709/217 |
| 7,519,916 B1 | 4/2009 | Hartwell et al. |
| 7,711,838 B1 * | 5/2010 | Boulter ............ G06F 17/30761 709/231 |
| 7,814,133 B2 * | 10/2010 | Hempleman ..... G06F 17/30038 707/607 |
| 8,996,420 B2 * | 3/2015 | Hug ................... G06F 3/04842 705/52 |
| 2003/0061615 A1 | 3/2003 | Van Der Meulen |
| 2004/0025185 A1 * | 2/2004 | Goci et al. ................. 725/92 |
| 2004/0162878 A1 * | 8/2004 | Lewis et al. ................ 709/204 |
| 2004/0254957 A1 | 12/2004 | Hyotyniemi et al. |
| 2005/0197961 A1 | 9/2005 | Miller et al. |
| 2005/0278415 A1 * | 12/2005 | Corbea et al. .............. 709/202 |
| 2006/0003753 A1 | 1/2006 | Baxter |
| 2006/0075934 A1 * | 4/2006 | Ram .............................. 108/44 |
| 2006/0156237 A1 * | 7/2006 | Williams et al. ............ 715/720 |
| 2006/0161635 A1 | 7/2006 | Lamkin et al. |
| 2006/0227673 A1 * | 10/2006 | Yamashita ............ G11B 9/022 369/30.08 |
| 2006/0242661 A1 | 10/2006 | Bodlaender et al. |
| 2006/0253542 A1 | 11/2006 | McCausland et al. |
| 2006/0259355 A1 * | 11/2006 | Farouki et al. .............. 705/14 |
| 2007/0033531 A1 | 2/2007 | Marsh |
| 2007/0037534 A1 | 2/2007 | Doudnikoff et al. |
| 2007/0203917 A1 * | 8/2007 | Du ..................... H04L 12/582 |
| 2007/0204004 A1 * | 8/2007 | Coyer et al. ................ 709/217 |
| 2007/0265910 A1 * | 11/2007 | Varghese ...................... 705/14 |
| 2008/0086379 A1 * | 4/2008 | Dion .................. G06F 3/04842 705/14.1 |
| 2008/0140717 A1 | 6/2008 | Rosenberg et al. |
| 2008/0141307 A1 * | 6/2008 | Whitehead ............ H04N 7/173 725/46 |
| 2008/0147711 A1 | 6/2008 | Spiegelman et al. |
| 2008/0154696 A1 | 6/2008 | Spiegelman et al. |
| 2008/0242280 A1 | 10/2008 | Shapiro et al. |
| 2009/0104870 A1 | 4/2009 | Christensen et al. |
| 2009/0228943 A1 * | 9/2009 | Ramaswamy et al. ......... 725/109 |
| 2009/0284657 A1 * | 11/2009 | Roberts et al. .............. 348/564 |
| 2012/0079385 A1 | 3/2012 | Ellis et al. |
| 2012/0209979 A1 | 8/2012 | Zabawskyj et al. |
| 2013/0268422 A1 * | 10/2013 | Ram et al. .................... 705/37 |

* cited by examiner

CUSTOMIZING PERISHABLE CONTENT OF A MEDIA CHANNEL

CROSS REFERENCE TO RELATED APPLICATIONS

The present U.S. Utility patent application claims priority pursuant to 35 U.S.C. §121 as a divisional of U.S. Utility application Ser. No. 12/229,515, filed on Aug. 22, 2008, entitled "SYSTEM AND METHOD FOR PROVIDING A RADIO-LIKE EXPERIENCE," issuing as U.S. Pat. No. 8,719,349 on May 6, 2014, which claims priority pursuant to 35 U.S.C. §119(e) to U.S. Provisional Application No. 60/957,955, filed on Aug. 24, 2007, entitled "SYSTEM AND METHOD FOR PROVIDING A RADIO-LIKE EXPERIENCE," both of which are hereby incorporated herein by reference in their entirety and made part of the present U.S. Utility patent application for all purposes.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

FIELDS

The systems and methods disclosed herein generally relate to the field of content customization and distribution.

BACKGROUND

Content consumers may have collections of media content, such as libraries of music. Those collections may be stored in local computers, or in remote servers, or in portable media devices. Consumers may also have arranged their content into playlists to create a certain listening experience. Moreover, consumers may have various content management tools and media players to arrange and play their content. Consumers do not, however, typically have the resources, skill or experience to create professional-sounding or radio-like listening experiences. Similarly, consumer-generated playlists typically provide a more monotonous listening experience, i.e., an all-music listening experience. And, consumers typically do not have the time or resources to add perishable content to their listening experience, such as news updates or weather reports.

Radio broadcasters, on the other hand, typically have the resources, skill and experience to create professional-sounding and radio-like listening experiences, e.g. radio broadcasts. Such broadcasts may provide a variety of content arranged so as to maintain consumer interest. For example, a jazz music radio broadcast may play a selection of music by a variety of jazz artists having diverse jazz styles. The jazz music may be interspersed with a generally pleasing mix of radio host commentary, advertisements, weather reports, news reports, station jingles, and the like. Also, each song or music element in the jazz broadcast may be mixed and edited to provide generally pleasing transitions, e.g., cross-fades and voiceovers. However, because radio broadcasters generally develop broadcast programs for a large audience, the broadcast programs may not be as fully pleasing or customized to an individual listener as the listener would like.

Some broadcasters provide an Internet broadcast that allows consumers to select content to listen to, whether by artist, genre, style, and the like, yet still comply with various regulations, e.g., those promulgated under the Digital Millennium Copyright Act ("DMCA"), and rights management schemes, e.g., digital rights management ("DRM"). However, such broadcasts may suffer from the same sort of monotony associated with consumer created playlists, and may fail to allow any further listener customization.

Additionally, many organizations typically do not have the resources or expertise to distribute content to their constituents. Organizations need a way to distribute content to their constituents in such a way and by such means that the constituent will receive and consume the content in a timely manner. For example, if a business desires to distribute an audio message from an executive, the business may circulate an email with information on how a user may listen to the message, e.g., by going online and downloading the message for playback, and urge the consumer to do so. However, many constituents may view those steps as too much of a hassle, and simply not listen to the message. Similarly, a church organization may desire a better way to distribute bulletin items or sermons.

Thus, there is a need for better systems and methods for engaging content consumers.

BRIEF DESCRIPTION OF THE DRAWINGS

FIG. 3 depicts an embodiment of a screen that may be provided for a user to register for access to a content distribution system.

FIG. 6 depicts an embodiment of a screen that may be provided for a user to customize perishable content scheduling for a radio-like station.

FIG. 7A depicts an embodiment of a screen that may be provided for a user to customize perishable content scheduling for a radio-like station.

FIG. 8 depicts an embodiment of a screen that may be provided for a user to manage a plurality of customized radio-like stations.

FIG. 9 depicts an embodiment of an interface that may be provided for a user to specify an RSS feed for inclusion in a radio-like station.

FIG. 10 depicts an embodiment of a screen that may be provided for a user to specify commercial listening preferences.

DETAILED DESCRIPTION

Figure 1:
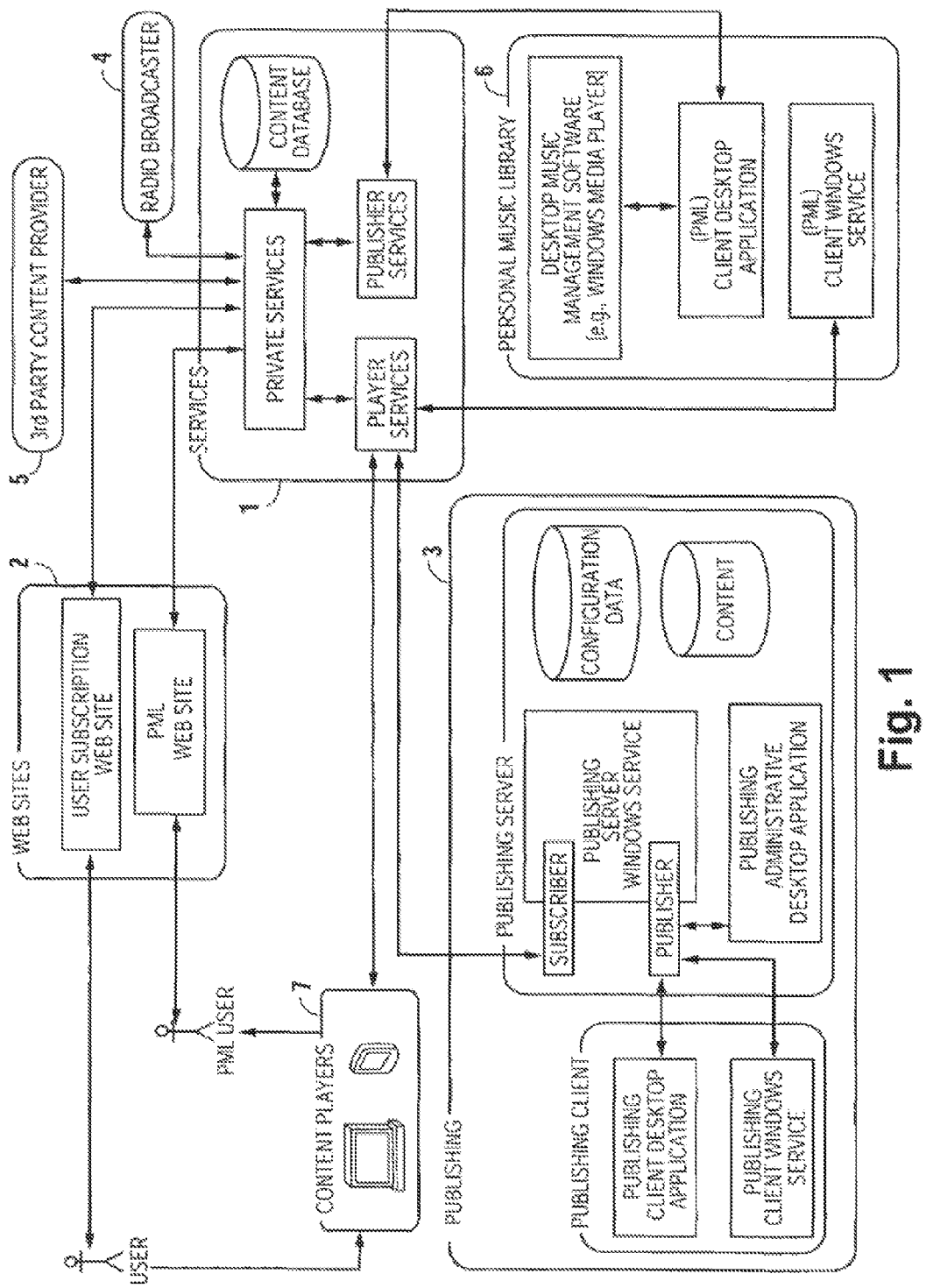
FIG. 1 depicts an embodiment of a functional diagram of various content distribution system components.

Generally, the disclosed systems and methods provide a way to engage content consumers with a more personalized, and more radio-like and professional-sounding listening experience.

From a content consumer's point of view, a media content management system and media player allow a user to choose to listen to content from various content sources, e.g., the user's personal music library, a subscription-based third party music library, a radio broadcaster's perishable content or other programming, a library of user-generated content, and third-party advertisement repository, other third-party sources, etc. Thus, for example, a listener may create a listening experience that includes approximately 50% jazz and 50% rock music from a jazz radio station and a rock music repository, respectively, and includes local news updates from a radio station in Atlanta, Ga., sports updates from a radio station in New York, N.Y., and weather and traffic reports from a radio station in the listener's home town. A listener may consume that content using a variety of devices, e.g., a PC, a portable media player, a PDA, a mobile phone, etc.

From the point of view of a content provider, a content distribution system may link together various content sources, such as those described above, and use content from one or more of those various sources to create pleasing listening experiences customized for listeners. A content provider may, for example, be a radio broadcaster or other organization having expertise in scheduling content to engage and hold a listener's interest. A radio broadcaster may, for example, rely on professional radio broadcast scheduling software to create such an experience with content from disparate sources, and may offer such content at various subscription levels, e.g., a free subscription level that includes a certain number of advertisements per hour, and a fee-based subscription level that includes no advertisement and allows inclusion of user-generated content. The content provider may, for example, schedule a playlist with music from a third-party music library, advertisements from an ad repository, weather reports from a radio station in the listener's home town, commentary from a nationally syndicated radio host, and music mash-ups from the listener's personal content library. Thus, in one embodiment, a content provider may provide a radio-like listening experience customized for a particular listener.

The foregoing general description is merely exemplary, of course, and should be viewed simply as a partial overview of the features and functionality of the systems and methods disclosed herein. Additional details, features and functionalities will become apparent below. Nevertheless, the foregoing description serves as a useful starting point in describing various preferred systems, graphical user interfaces, content sources, distribution methods and other aspects.

Functional Overview

In one embodiment, a content distribution system may comprise a suite of components that may provide a customized and radio-like listening experience to listeners. In one embodiment, the suite may comprise (1) a services component, (2) a subscription-based content component, (3) a personal media library component, (4) a content player component and (5) a publishing component. Functional segmentation of the content distribution system may be used to facilitate design, development, deployment, and reuse of system functionality. That is, the content distribution may be designed around a set of services that are assembled to interoperate as various applications. An exemplary functional overview of each component is provided below.

A services component may provide a centralized location for accessing common content distribution system business logic and data storage functionality that is needed by all content distribution system components. These services may be grouped into seven functional areas: Content Services, Customer Services, Logging Services, Content Player Services, Personal Publishing Services, Scheduling Services, and Data Services. Content Services may provide the business logic storage related to content files and content categorization for both music (and other content) and perishable content sources and categorization criteria. Customer Services may provide the business logic related to registered users, their accounts and historical listening data. Logging Services may provide the business logic storage related to internal logging needed for system monitoring and configuration. Content Player Services may provide the business logic needed to properly synchronize content players with the listening experiences configured by users. All user access to content distribution system services from external sources may be directed through Player Services. Personal Publishing Services may provide an interface for communication with the publishing component. Scheduling Services may provide the business logic related to radio station schedules. Data Services may provide for the retrieval and persistence of data related to the content distribution systems. The services component is discussed in more detail below.

A subscription-based content component may provide an end user system that delivers a radio-like experience utilizing a subscription based content model that may include content from third-party content providers. Users may create and maintain their accounts through a browser-based GUI or website provided by the content distribution system. The website may allow users to configure various radio-like "stations" by selecting the music, other content and perishable content to create a particular listening experience. When registering for an account, a user may subscribe to a free or fee-based account. A free subscription may allow a user to participate but may require a user to periodically listen to commercials. A fee-based subscription, on the other hand, may provide a user with the option of excluding commercials. Content delivery may be configured administratively by the content distribution system operator. For example, a content distribution system operator may be a radio broadcaster that operates one or more radio broadcasting stations.

In one embodiment, music content may be provided by a third party music provider, and may be downloaded or streamed directly from the third party source. Commercial content may be provided by a third party, or by the operator of the content distribution system. Users may select a category (or categories) of commercials that they would prefer to hear. If a user does not select any commercial preferences, the commercials they hear may be randomly selected from all available categories. Commercials may comprise audibly-manifested media elements, visibly-manifested media elements, or a combination of the two. Thus, for example, a listener may view a commercial on a PC-instantiated media player while also listening to that commercial. Or, a listener may view a commercial (e.g., a scrolling banner ad, a music album cover with "Buy Now" flashing over it, or a video clip) on a media player while listening to music.

Perishable content may be provided by the content distribution system operator, or by a third party. If, for example, the third party is a radio broadcaster, perishable content categorization information may be maintained within Content Services, but the content itself may be maintained by the radio broadcaster (e.g., at its participating radio stations). Users may define perishable content themes that describe the type of perishable content and the frequency it should be injected into radio-like "station."

When a user creates new station preferences or edits their station preferences, Scheduling Services may create or update a schedule (playlist) of audio content for that station based on the user's specifications. These schedules may be stored until downloaded or streamed to a user and played by a content player.

From the content distribution system website, a user may download a content player to desktop computers, laptop computers, or various portable content playback devices. The number and types of content players that a user can download may be configurable. For example, once certain limits are reached, existing content players may be deactivated before additional content players may be downloaded or re-enabled.

Once a user has established an account, configured stations, and downloaded a player, the user may synchronize the player and begin listening to his radio-like "stations." The synchronization process may obtain the station schedules from the server, and download or stream content, e.g., music, commercial content and perishable content, to the player. As users listen to their stations, the content player may check for the most recent versions of their configured perishable content and play it.

Upon subsequent synchronizations, the station schedules on a content player may be updated by replacing the played portion with new content. During the synchronization, station playback history may be returned to the content distribution system for review by a user via the website, and made available for overall application reporting purposes. When synchronization is complete, Schedule Services may generate additional schedules to provide content to replace what has been played on the player. New schedule content will be available for subsequent downloads.

A personal media library (PML) component may provide an end user system that delivers a radio-like listening experience that includes the user's own personal media in addition to other content, e.g., perishable content. Preferably, a user to legally own a collection of content, and have categorized and managed that content. Thus, a user may configure stations using their own criteria for the content.

In one embodiment, content may be limited to the user's personal media library. This approach may provide a way to deliver a radio-like experience without the relatively high costs of paying for third-party content. In that embodiment, a user may subscribe as a PML-only subscriber.

Similar to the subscription-based content component, a PML-only user may connect to a content distribution system website and register as a PML-only user. In one embodiment, a PML-specific website may be provided. A user may set up a free or fee-based subscription. A free subscription may allow a user to participate in the PML experience, but require that the user periodically listen to commercials. By selecting the fee based subscription, the user may elect to not listen to commercials.

In one embodiment, a user may download PML software to their computer after registration. Preferably, a user may create/edit content playlists within a media management application, such as iTunes or Windows Media Player. A user may then create stations based upon those playlists, or by audio file properties (e.g., as defined by Windows Media Player, or by a tempo analysis done by the Selector® music scheduling program from ReS). Generally, stations defined from Windows Media Player play lists may be static in nature and may play the same songs in the same order as defined by the playlist. Stations defined by audio file properties may randomly choose songs that match the defined audio file characteristics.

PML commercial content may be provided by the content distribution system operator, and may be configured administratively. Preferably, users may not select the types of commercials they want to hear; rather, the commercials may be randomly selected from all available commercial spots. In other embodiments, however, a user may select commercial listening preferences as with the subscription-based content component.

With respect to perishable content, a PML-only subscription may allow users to define perishable content themes. A perishable content theme may describe the type of perishable content and the frequency with which it should be played. In one embodiment, perishable content and categorization information may be maintained and obtained from the PML software or on a publishing server (discussed in more detail below).

After a user has defined his stations and perishable content themes, he can download a content player to desktop computers, laptop computers, or various portable handheld devices, as discussed above. In this embodiment, the media player need not be provided as part of the PML software. Once a user has established an account, configured stations, and downloaded a player, the content player may be synchronized with the content distribution system, and the user may listen to his stations. As a user listens to his station, the content player may check for the most recent versions of their configured perishable content and play it. Upon subsequent synchronizations, the station playlists on the content player may be updated. If a playlist is large, synchronization may only involve replacing the played portion of the play list with new unplayed portions. During synchronization, station playback history may be returned to the server for review by the user, and made available for overall application reporting purposes.

A content player component may provide a content player to users for various operating environments, e.g., Windows Desktop/Laptop, Windows Mobile and Symbian devices such as a Nokia smart phone. A content player may comprise two main functional operations, namely, Synchronizing and Playing.

Synchronizing may allow a user to update their stations and content by interacting with the content distribution system and content providers to obtain new schedule information, content and to report played-content history back to the content distribution system. Synchronization requires connectivity to remote services and processes, and thus may only take place when the content player is connected to the content distribution system via a network, e.g., through a wireless connection or while connected via a network connected computer. Various levels of synchronization may occur depending upon the speed and quality of the network connection.

Playing may involve playing content according to user schedules, and recording playback history. Playing may not require connection to the content distribution system; however, obtaining fresh perishable content may require a network connection. During playback, the radio-like experience may be manifested in, for example, various transitions between content elements, e.g., audio cross-fading. For example, as a song nears its end, the next song may begin playing, thus removing a discernable pause between tracks. Additionally, a content player may inject perishable content, e.g., News, Weather, Sports and Traffic reports, based on a user's subscription settings.

A publishing component may provide a means for organizations or individual users to publish audio content to a common, searchable repository. This common repository may facilitate searches by and distribution of available content to subscribers, e.g., organizations and users, as well as use by a content distribution system.

A publishing administrator may be responsible for configuring a centralized publishing service and granting publishing rights to various publishers, e.g., organizations and individuals. The content distribution system may provide publishing software, e.g., a content player enhanced with content recording and mixing functions. Organizations may utilize such software to create and define content for publication. Publishers may configure content based on specified categories and sub-categories (e.g., as may be defined by the administrator), and a target region (e.g., by country, state, city as may also be defined by the administrator). A publisher may identify a content category item to be a single audio file, or may configure a schedule which determines the appropriate audio file to be published at a given time.

When a content category item is configured, the publishing component may watch for newly-published files to appear in the configured locations. When new files are detected, the new files may be scanned for viruses and scanned according to other rules, e.g., DRM review and mature or illegal content. Then, new files may be made available on a publishing server, or otherwise published to subscribers, e.g., for inclusion in a station playlist.

In another embodiment, a content distribution system may comprise a slightly different suite of components, namely, (1) a services component, (2) a web sites component, (3) a personal media library component, (4) a content player component and (5) a publishing component. FIG. 1 depicts an embodiment of a functional diagram of those content distribution system components.

A services component 1 may provide a core set of business and data services needed to support all other content distribution system functionality.

A web site component 2 may provide user interfaces that allow administrators and customers to interact with the content distribution system. These web sites may provide the primary point of interaction for administrators and users of the content distribution systems, even though some functional areas may have separate user interfaces.

A publishing component 3 may provide a source of perishable content or user-generated content. The content distribution system may utilize other providers, such as radio broadcasters 4 for music content The content distribution system may utilize third party content providers 5 for music content. A personal music library component 6 may provide an alternative to this, by allowing users to use their own personal music (on their Internet connected computer) as a source of music content instead of relying on third party content providers 5 or other content sources.

A content players component 7 may be where users primarily live and interact with their configured radio-like "stations." Content players may exist for various distinct environments, e.g., Windows Desktop/Laptop, Windows Mobile and Symbian devices.

Thus, users may interact with a content distribution system and personalize their listening experience from easily accessible and easy to use web sites and/or desktop applications. Those having skill in the art will recognize, of course, that "listener" and "user" may interchangeably refer to a device user, a media consumer, a media generator/creator, and the like, whether the media be audible, visual, audio/visual, data or text, and whether an individual or not. These websites and applications may interact with core services that store preferences, organize schedules and content, and deliver the configuration and content for a radio-like experience to content players. The radio-like experience may be delivered as one or more "stations" grouped into user-configurable "bands." The stations may be user-configurable (e.g., by artist and genre), so they contain only the audio files desired by the user. The radio-like experience may further allow users to choose up-to-date localized news, weather, traffic, sports, and other short-life-span or perishable media content for inclusion in the "radio broadcast." The content players thus look and act like a real radio-only better.

Content Distribution System

The focus thus turns to describing an exemplary content distribution system for providing such an experience. Generally, the system may provide a way to access content from various sources, schedule that content into a radio-like listening experience, and provide that content to users. The system may also allow users to set up subscription accounts, set user content preferences, upload content, and provide feedback to a content provider.

Figure 2:
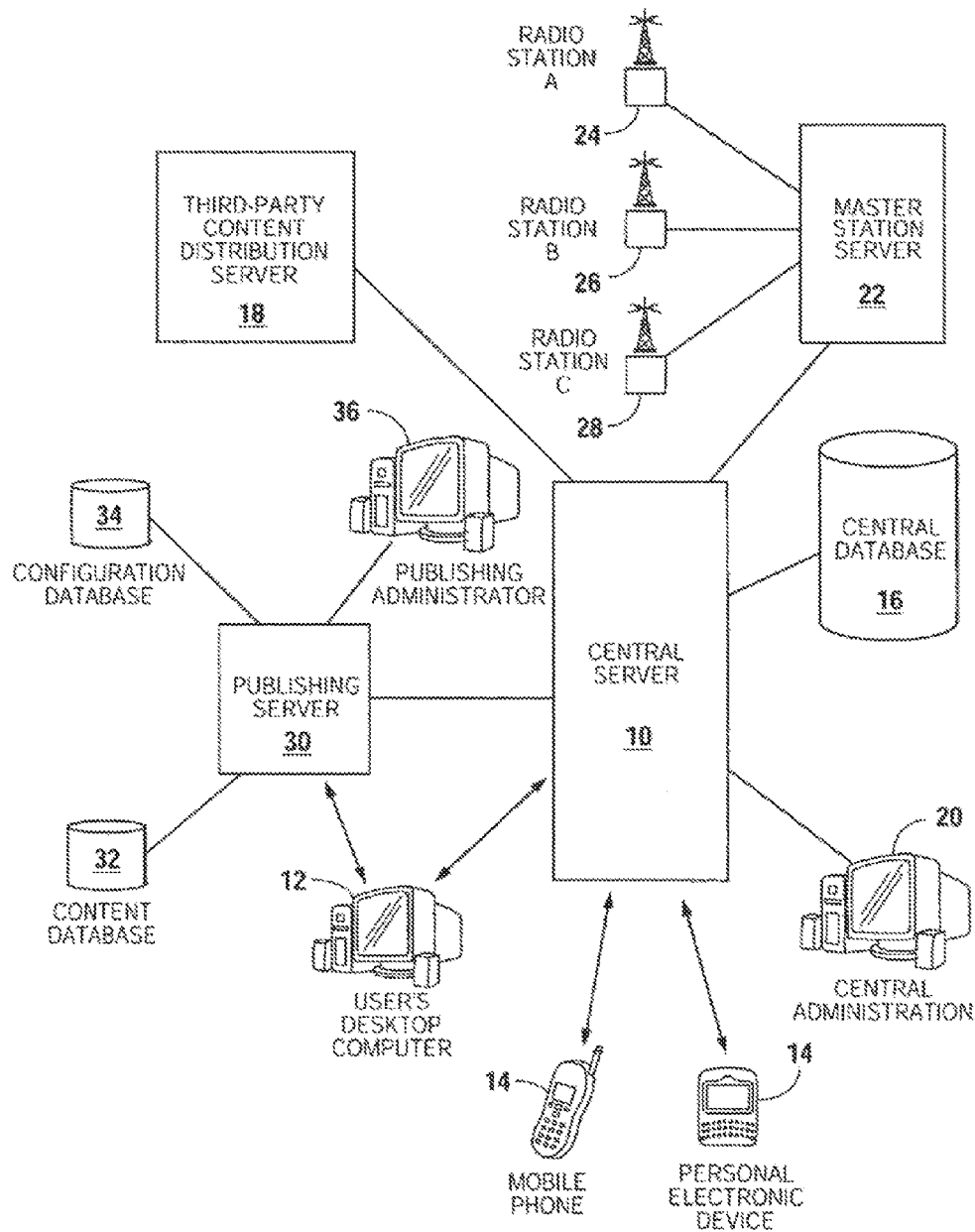
FIG. 2 depicts an embodiment of a system for providing a radio-like experience.

FIG. 2 discloses one embodiment of a content distribution system operated by a radio broadcaster. Those skilled in the art will recognize that the content distribution system may be operated by any other suitable content provider, such as a business or religious organization. In the embodiment of FIG. 2, a central server 10 provides a central location through which content may be distributed to various users. A system administrator may interact with the central server 10 using an administrative computer 20. The central server 10 may store, process and retrieve user configuration files, account information, subscription payment, demographic information, media content, perishable content, system configuration data, and other data in a central server database 16.

The central server 10 may be connected to various content sources. In this embodiment, the central server 10 may be connected to a third-party subscription-based content server 18. The third-party server 18 may, for example, host a library of music for downloading or temporary use, or provide a stream of music. The third-party server 18 may also provide content metadata, e.g., data relating to the genre, sub-genre, artist, title, duration, etc. Those skilled in the art will recognize that the third-party server 18 may actually comprise a plurality of servers operated by a content distributor, and each of the plurality of servers may provide a different type of content, e.g., music, advertisements, infomercials, talk-radio programs, prearranged playlists, etc. Additionally, the content distributor may distribute content in compliance with DCMA and DRM rules when played, and provide royalty payment and management services. The content distributor may distribute media content in multiple formats, as well, such as in AAC and MP3 formats.

The central server 10 may also be connected to a master radio station server 22 that receives, processes, stores and serves content from one or more of radio stations A 24, B 26 and C 28. In this embodiment, the radio stations provide perishable content, e.g., geographically localized news broadcasts, weather reports, traffic reports, sports broadcasts, advertisements, public-service announcements, DJ content or "chatter," "marquee" content, "ticker" content, alerts and the like that have a relatively short life span or are time- or locale-sensitive.

Of course, in various embodiments a central server 10 may receive perishable content directly from radio stations, as well. For example, the master radio station server may be connected to a plurality of radio stations that may be situated in various geographic locations, and may be connected to a plurality of radio stations situated in a common geographic location. Those skilled in the art will recognize that radio stations may broadcast over-the-air, via Internet, via satellite or by any other suitable transmission means. Those skilled in the art will further recognize that one or more of the radio stations may simply be Internet-based streams or aggregated content feeds, from the master radio station server 22, that pertain to various demographics or geographic locations.

In the embodiment of FIG. 2, the master radio station server 22 may serve as a common location from which the central server 10 may draw perishable content from radio stations in different parts of the world. Station A 24 may be located, for example, in Victoria, BC. Station B 26 may be located, for example, in San Antonio, Tex. Station C 28 may be located, for example, in Tolagnaro, Madagascar. The central server 10 may receive from the master station server 22 a list of radio stations in various geographic locations, e.g., San Antonio, Tex., that a user views in designing a listening experience, as discussed in more detail below.

The central server 10 may also connect to a publishing server 30 that stores user created content uploaded by various users. As discussed in more detail below, a user may create content and upload the content to a publishing server 30 for distribution to a target audience, such as to a particular listener group or the inhabitants of a particular geographic region. The publishing server 30 may store user created content in a content database 32. The publishing server 30 may also store user configuration files and distribution protocols in a configuration database 34. A publishing administrator may interact with the publishing server 30 and databases 32 and 34 from a publishing administrator computer 36.

Users may connect to the central server 10 through their personal computers 12 and/or mobile electronic devices 14. The mobile electronic devices 14 may include, for example, cellular phones, PDAs, and portable music players. Users may use software applications downloaded or otherwise served from the central server 10 to their personal computers 12 and/or mobile electronic devices 14. Users may also download software applications from the central server 10 to their personal computers 12 and/or mobile electronic devices 14 that allow users to create and publish their own media content.

Additionally, users may upload a representation of media content from a user's own personal media library, such as a playlist of music files, to the central server 10, or to the publishing server 30. Alternatively, the media content itself may be uploaded. If uploaded to the central server 10, for example, the central server 10 may schedule the user's content according to the user's preferences, and return are-arranged play list to a user for playback. Those skilled in the art will recognize that users may upload media content or its representation from a user computer 12 or from a mobile electronic device 14.

Those skilled in the art will recognize that the various devices disclosed in FIG. 2 may communicate via one or more networks. A network may be any type of electronically connected group of computers or electronic devices including, for instance, the following networks: Internet, Intranet, Local Area Networks (LAN), Wide Area Networks (WAN), cellular communication networks, PSTN, or an interconnected combination of these network types. In addition, the connectivity within a network may be, for example, remote modem, Ethernet (IEEE 802.3), Token Ring (IEEE 802.5), Fiber Distributed Datalink Interface (FDDI), Wi-Fi (IEEE 802.11), Wi-Max (IEEE 802.16), GSM, CDMA, 3G, D-AMPS, Asynchronous Transfer Mode (ATM), or any other communication protocol. Those having skill in the art will recognize that the devices in FIG. 2 may be any suitable device, such as a desktop computer, server, portable device, hand-held device, set-top box, cellular phone, personal digital assistant (PDA), a terminal, thin client, or a suitable device of any other desired type or configuration. Those having skill in the art will recognize that network-connected devices, and devices connected to each other, may vary widely in processing speed, internal memory, communication capability, and other performance aspects, as may be suitable for the various functionalities described herein. Such devices may also be geographically dispersed. Communications within the network and to or from the computing devices connected to the network or each other may be either wired or wireless, and may be established by physical, electronic, optical, or other means. Wireless communication may be especially advantageous for network connected portable or hand-held devices. A network may include, at least in part, the world-wide public Internet which generally connects a plurality of users in accordance with a client-server model in accordance with the transmission control protocol/internet protocol (TCP/IP) specification. A client-server network may provide a dominant model for communicating between two computing devices. Using this relationship, a client computer (a "client") may issue one or more commands to a server computer (the "server"). The server may fulfill client commands by accessing available network resources and returning information to the client pursuant to client commands. During this process, client computer systems and network resources resident on the network servers may be assigned a network address for identification during communications between elements of the network. Communications from other network connected systems to the servers may include the network address of the relevant server/network resource as part of the communication so that the appropriate destination of the data/request may be identified as the recipient. If a network comprises the global Internet, the network address may be an IP address in the TCPIIP format which may, at least in part, route data to an e-mail account, a web-site, or other Internet tool resident on the server. Thus, information and services resident on the network servers may be available to the web browser of a client computer through a domain name which maps to the IP address of the network server.

In one embodiment, the content distribution system architecture may be provided through a Service Oriented Architecture (SOA) and follow guidelines outlined in Windows Server System Reference Architecture (WSSRA). In such an embodiment, the architecture may provide various layers of security, e.g., a player zone, a perimeter trust zone, and an internal trust zone. All external system requests may originate from the player zone through, for example, a browser-based graphical user interface provided on a PDA. All user devices may be treated as part of the player zone. The player zone may be separated from the perimeter trust zone by a firewall. Requests originating from the player zone may pass through the firewall to the player trust zone. Components in the perimeter trust zone, such as the publishing server 30 and sections of the central server 10, may authenticate and verify incoming requests from the player zone. Requests originating from the perimeter trust zone may pass through a firewall to the internal trust zone. Components of the internal trust zone, such as various databases, and SQL and backend servers, may authenticate and verify incoming requests from the perimeter trust zone.

Those skilled in the art will recognize that the various servers, computers and databases described in FIG. 2 may be provided in any suitable configuration. For example, the central server 10 may in practice be provided as load balanced server clusters, some of which may handle backend services, and some which may be web servers that handle requests from the player zone. Other servers, databases and computers may in fact comprise one or more suitable devices.

Likewise, any suitable device configuration may be used. For example, web servers may run Windows Server 2003, have 1 Gb of memory and 50 Gb of hard disk space. SQL servers may run Windows Server 2003, have 2 Gb of memory and 100 Gb of hard disk space. Services cluster servers may run Microsoft SQL Server 2000, have 1 Gb of memory and 100 Gb of hard disk space. A user computer may run Windows XP, have 256 Mb memory and 1 Gb hard disk space, and have Windows Media Player v.10, and Internet Explorer v.6.0 installed.

For further example, the communication protocol between the user devices running the content player described below and components located in the perimeter trust zone may occur via HTTP port 80 or HTTPS port 443. The communication protocol between components in the permit or trust zone and the internal trust zone may occur via .NET remoting over port 80. Communication between the internal trust zone and third-party sources, e.g., over the Internet, may be by any suitable protocol.

Those skilled in the art will recognize that content may be provided to a user device by any suitable means, such as by downloading or streaming or some combination thereof. Content may be buffered or stored to allow a user to skip content while listening to a station and to allow playback of perishable content when a user device is not connected to the central server 10.

Account Setup

The content distribution system may allow a user to set up a new account. In one embodiment, the central server 10 may provide a browser-based graphical user interface for manifestation on user computer 12. For example, a radio broadcaster may provide one or more webpages that contain a link to a new account registration page, such as that depicted in FIG. 3.

Figure 3:
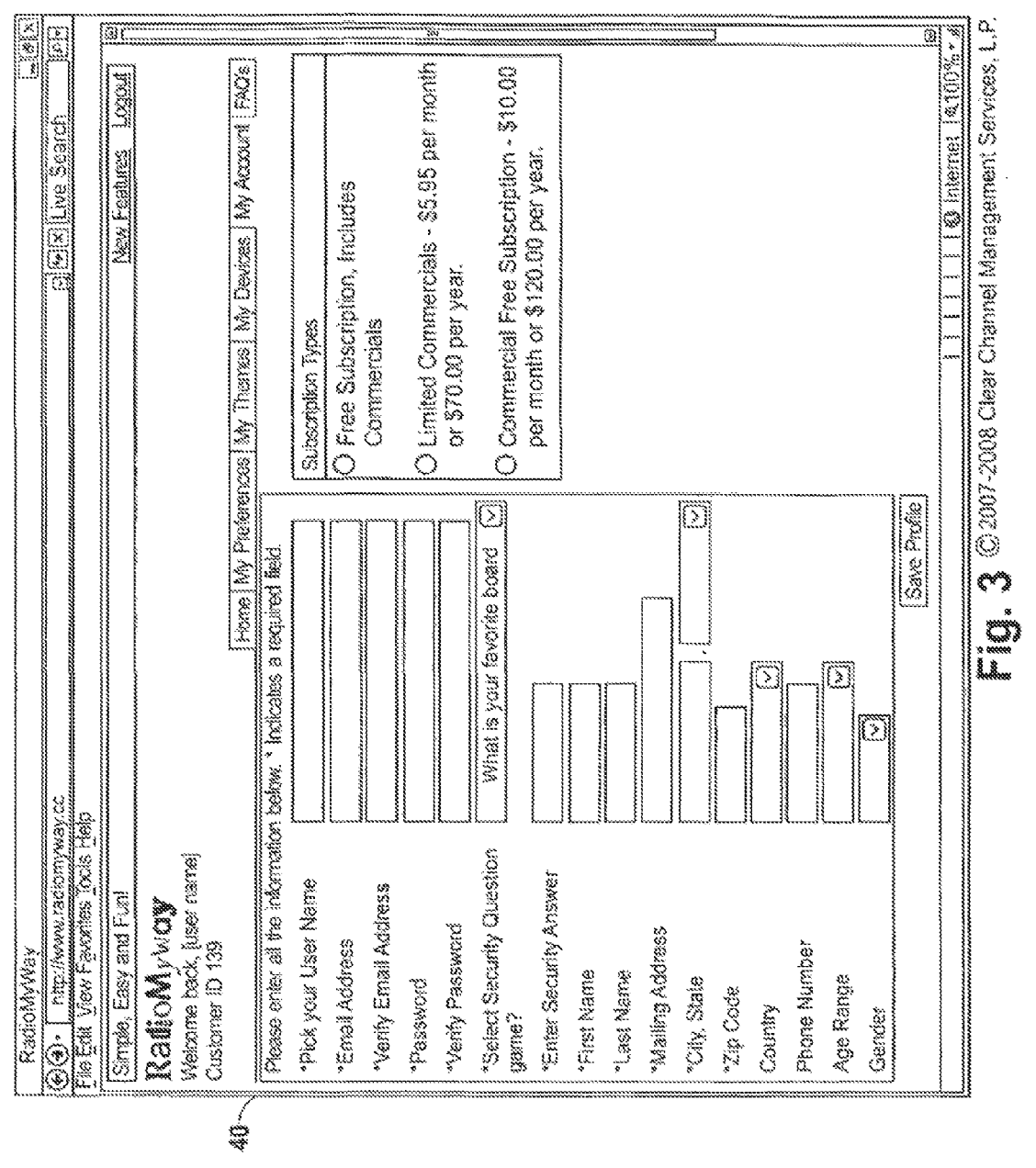

A user may create a new user account through the web site or through a web site launched by the application, as shown in the embodiment of FIG. 3. As shown in the embodiment of FIG. 3, a new user may provide a unique user login name and select a password that may be used to allow access to media content and perishable content. The user's login name may, for example, be the user's e-mail address. A user may also provide contact and demographic information. The user may also provide a user profile. For example, the application may prompt the user to enter demographic information, such as age, sex and zip code. The application may also ask marketing questions during subscription set up. Marketing questions may be used to support content scheduling and advertisement selection. Confirmation that a new account has been set up may be sent to the user's e-mail address.

In the embodiment of FIG. 3, a user may subscribe at one of several levels of access. One level of access may be provided to the user free of charge, if the user agrees to listen to a certain number of advertisements each hour. Another level of access may be provided at a subscription rate that depends on how many advertisements (or how many minutes worth of advertisements) the user is willing to listen to. A premium subscription level may provide access to an advertisement-free listening experience. Additionally, a trial subscription period may be offered. A user may set up multiple subscriptions, e.g., by registering through various radio station websites.

Although not shown in the embodiment of FIG. 3, a user may be presented with various payment options, such as by credit card, PayPal or upon invoice. A user may also be presented with various payment periods, such as monthly payment or annual payment. A user may also be presented with the ability to link an account with a "shopping cart" that may be used to purchase content while listening. Thus, a user's account may include financial account details.

Customizing a Listening Experience

Figure 4:
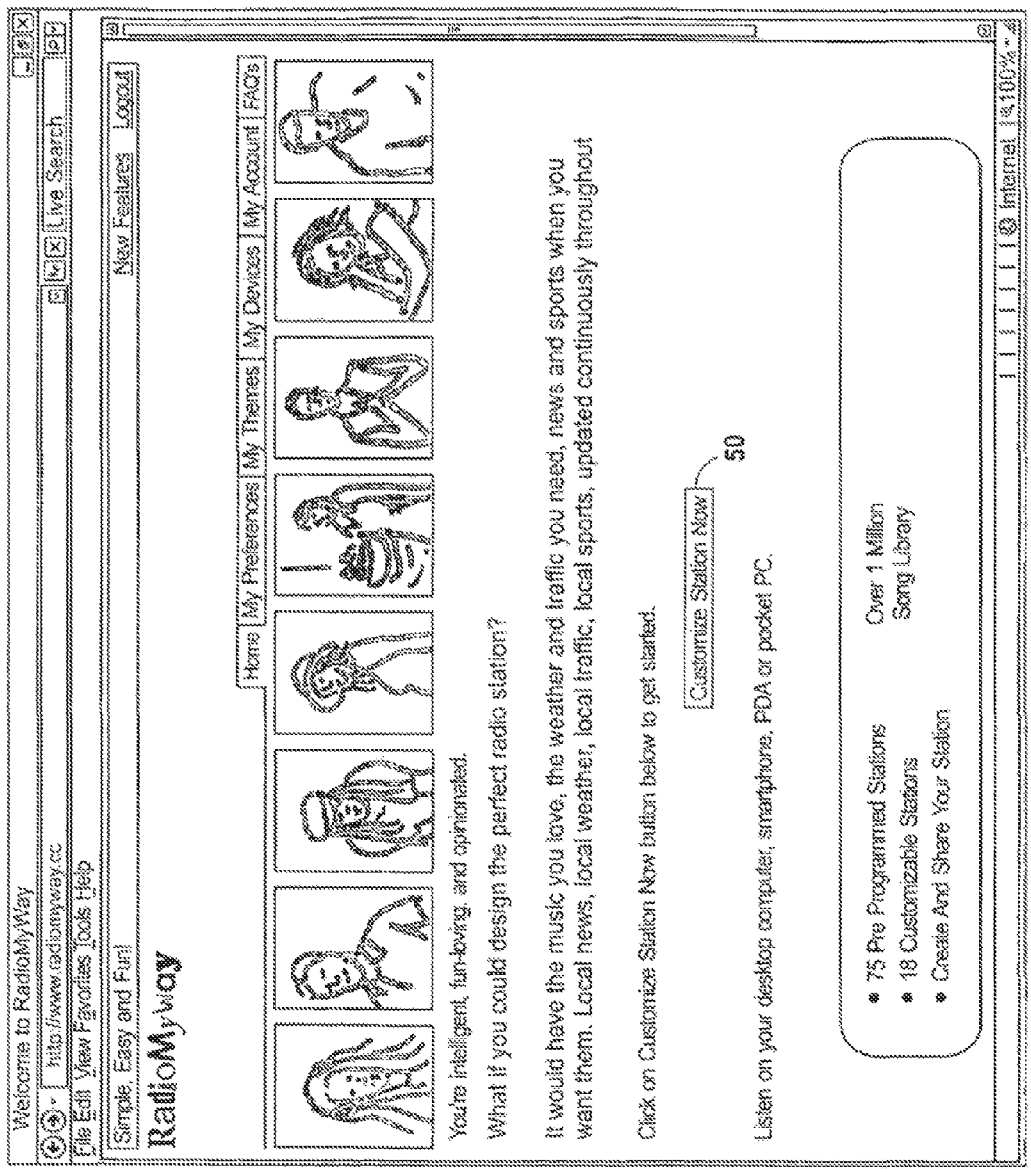
FIG. 4 depicts an embodiment of a screen that may be provided for a user to initiate customizing a radio-like station.

After setting up a new user account, a user may be provided the opportunity to customize his listening experience. The central server 10 may provide the new user with a user interface, such as the exemplary web browser-based screen of FIG. 4, that allows the user to begin the customizing process by clicking on a Customize Station Now button 50.

Figure 5:
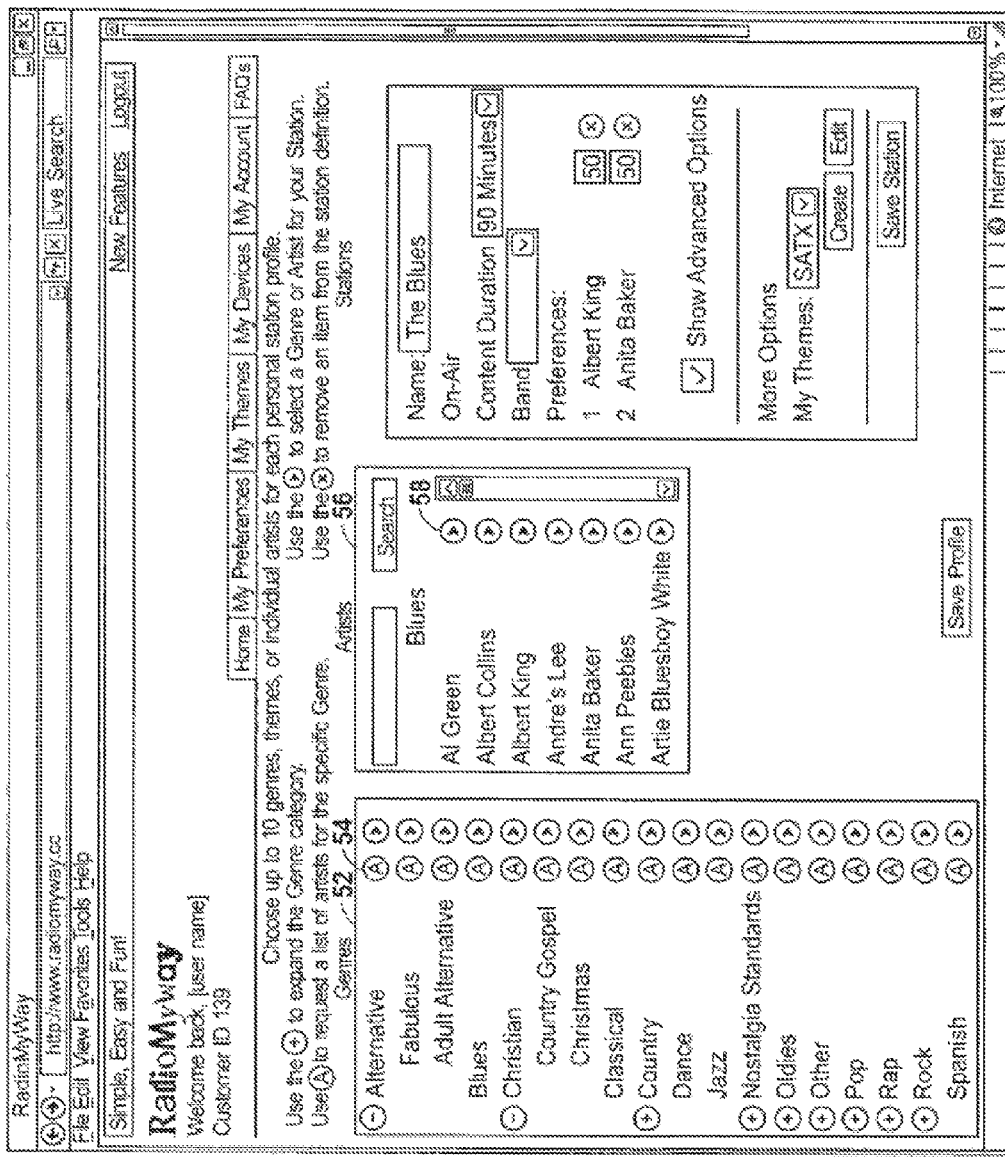
FIG. 5 depicts an embodiment of a screen that may be provided for a user to customize a radio-like station.

In one embodiment, a user may set up one or more pseudo-radio "stations" that may each be associated with a different listening experience or "theme." Thus, in one embodiment, a user may create a radio-like listening experience with content from various sources. As shown in the embodiment of FIG. 5, for example, a user may choose one or more preferred music genres and select various artists from within those genres to create a particular listening experience for a "station." Various controls may be provided to facilitate user selection. In this embodiment, under the "Alternative" genre, clicking on the "EIf" button may expand the listing to include the sub-genres "Fabulous" and "Adult Alternative." Referring still to FIG. 5, after identifying a desired genre in the table of Genres 52, such as "Blues," a user may click on the circled "A" button 54 to view the artists associated with the genre. In this example, blues artists such as Al Green, Albert Collins, and Albert King appear listed in Artists table 56. A user may click on the circled ">" button 58 next to an artist's name to select that artist. In this example, Albert King and Anita Baker had been selected for a station named "The Blues." The user may, of course, remove an artist by clicking on the "<8>" button. In this embodiment, various controls may be provided to allow a user to listen to a short sample of a song, a music genre, or a sampling of songs representing an artist's musical style.

The user may also specify how long the selected content is to play without repeating. In this example, the station may play a blues song rotation for 90 minutes before starting over. Also, the user may specify a particular "band," to which the "station" will be assigned. As will be discussed below in connection with the user interface for the media player, a "band" may be presented to the user as analogous to the station settings on a car radio. Each band may include one or more stations. The number of bands and stations may be determined by a user's subscription level. The user may further specify a preference as to what percent of air time a particular artist should be played. In this example, the user has specified that Albert King's songs play approximately 50% of the station air time, and that Anita Baker's songs receive the remaining air time.

Figure 6:
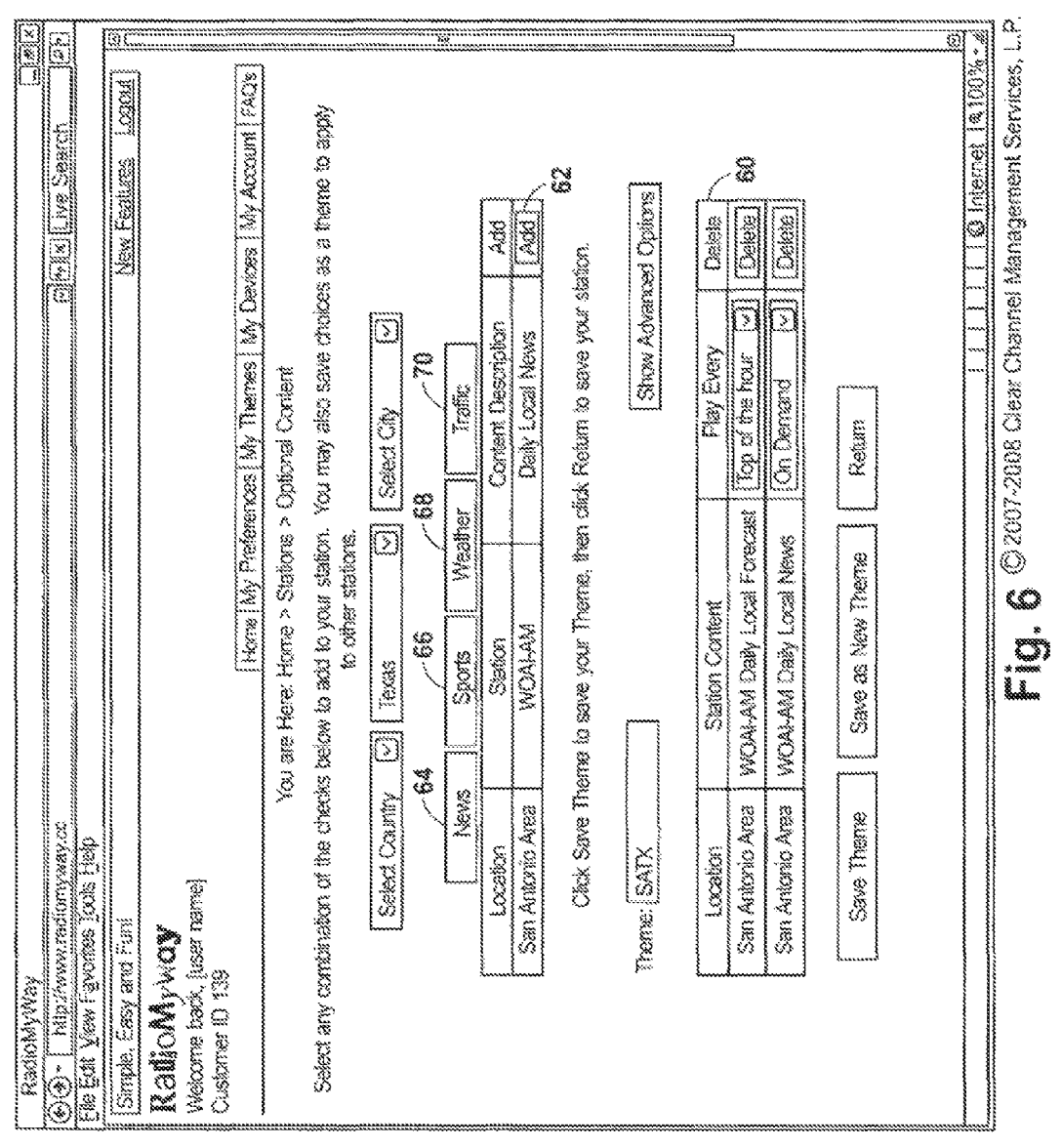

Additionally, a user may choose an overall "theme" for the station. In this embodiment, the particular theme may be a geographic location from which perishable content is drawn. To create, edit or delete a theme, a user may be presented with a user interface, such as that of FIG. 6, that allows selection of perishable content from various radio stations in that geographic area. In the embodiment of FIGS. 5 and 6, the user has selected a theme related to San Antonio, Tex. Those skilled in the art will recognize, of course, that the user need not reside in a particular geographic location in order to enjoy perishable content from that location. A user might, for example, reside in Ogallala, Nebr., yet still enjoy perishable content from San Antonio, Tex., or from any other (or a mixed variety of) geographic locations. In this embodiment, a user may choose a different country, state, and city from which to listen to perishable content, as provided in the embodiment of FIG. 6. A user need not select the most specific available geographic region, i.e., a user may select, for example, only a country, and receive a listing of perishable content available from that country. In various embodiments, other geographic regions or other sources of perishable content (such as trade associations or other special interest groups) may be defined. Thus, a user may select perishable content according to preference. A radio broadcaster operating the content distribution system may choose to make available only those radio stations under its control. A content distributor may also make various content sources available depending on subscription level. A content distributor may provide a number of preprogrammed themes that can be selected by a user, and also provide a number of preprogrammed stations that can be selected by the user, as well.

Referring still to the embodiment of FIG. 6, upon selecting a geographic location or region for listings of available perishable content sources in those areas, a user may sort the results by type of perishable content by clicking on various buttons. In this embodiment, a sports button 66, a news button 64, a weather button 68, and a traffic 70 reports button may be provided that correspond to the types of perishable content commonly offered by radio stations, i.e., news, weather, traffic and sports (also known as "NWTS"). If a user selects the news button 64, for example, the San Antonio, Tex., radio station WOAI-AM (e.g., station B 26 in FIG. 2) appears as a source for news reports. If the user desires to listen to news pertaining to San Antonio, the user may add that San Antonio area news station to his "The Blues" station by clicking the "Add" button 62 to add San Antonio news content to the theme.

The various perishable content components of the theme may be displayed in the lower portion of the exemplary screen of FIG. 6. As may be seen there, a user has chosen both weather reports and news reports from WOAI-AM. A user may further specify how often each type of perishable content is to be played. For example, a user may choose to listen to a weather report at the beginning of each hour, and listen to a news report on demand. Also, a user may choose to have public service announcements or emergency alerts delivered on an expedited basis (not shown in FIG. 6). And, of course, a user may also delete a source of perishable content by using a delete button 60.

In various embodiments, other types of perishable content may be made available, e.g., "DJ Chatter" from a particular radio personality, or talk radio program, or other content of interest. For DJ chatter, for example, a user may be presented with an option for more chatter or less chatter. Perishable content does not have to pertain to a particular geographic location, but may pertain to a particular issue of the day, a particular audience, or a particular event, to name a few examples. For each of those types of content, a user may select a San Antonio area station from which perishable content is to be used, or may select perishable content from another geographic region or other desirable content. As discussed below, such other desirable content may include user created content or content from a personal music library.

Figure 7A:
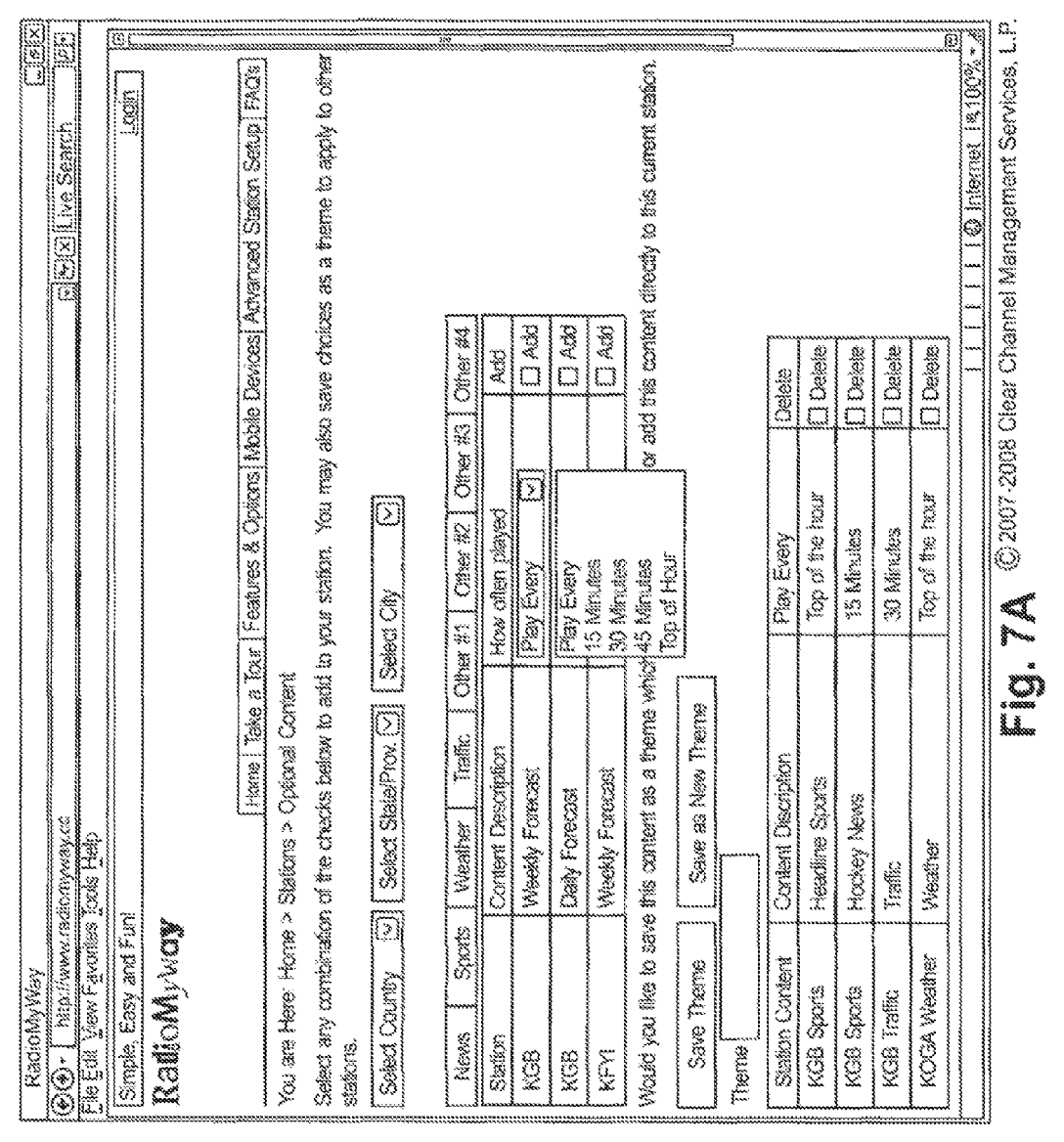

FIG. 7A illustrates another embodiment of a screen through which a user may establish a theme. In this embodiment, a drop-down menu may be seen that allows a user to select how often perishable content is played. For example, if a user prefers to listen to a longer play list of music without interruption, the user may choose to only play perishable content on demand. Or, if a user prefers to break up a play list of music, the user may specify an interval or time at which each type of perishable content should be played.

Figure 7B:
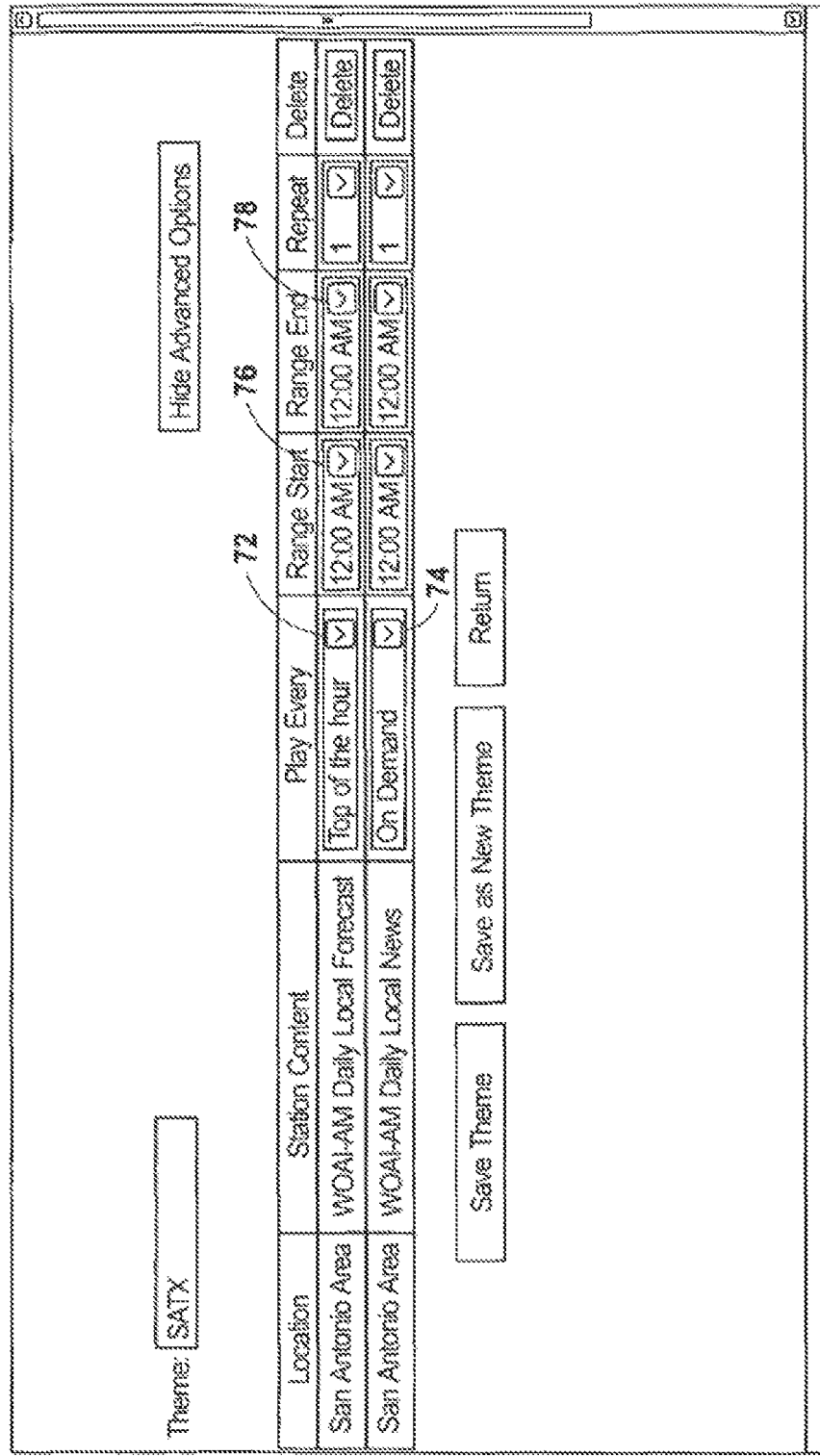
FIG. 7B depicts an embodiment of a portion of a screen that may be provided for a user to customize perishable content scheduling for a radio-like station.

As shown in the embodiment of FIG. 7B, more advanced timing options may be provided to a user. Using drop down menus 72 and 74, for example, the user may elect to have the San Antonio area forecast played at the top of every hour, and the San Antonio area news played on demand. Using more advanced options, for example, as may be provided in drop down menus 76 and 78, a user may choose to define a specific time range to play a perishable content item, and may specify how many times ("repeat") that they wish to hear the same perishable content. For example, a user may desire to hear traffic reports only between the hours of 7 AM and 9 AM, and between 4 PM and 6 PM. The media player may, by default, inject and play each new perishable content file one time and not inject or play the same item again until it has been refreshed; however, the user may override that and specify how many times the same perishable content is to be repeated. After the same perishable content has been played for a specified number of times, the audio file for the perishable content may not be played until it has been refreshed with new content during synchronization with the central server 10. Alternatively, a content distributor may establish an expiration date for perishable content and prevent expired perishable content from being played. A content distributor may provide fresh content of the type and source as specified by the user.

Figure 8:
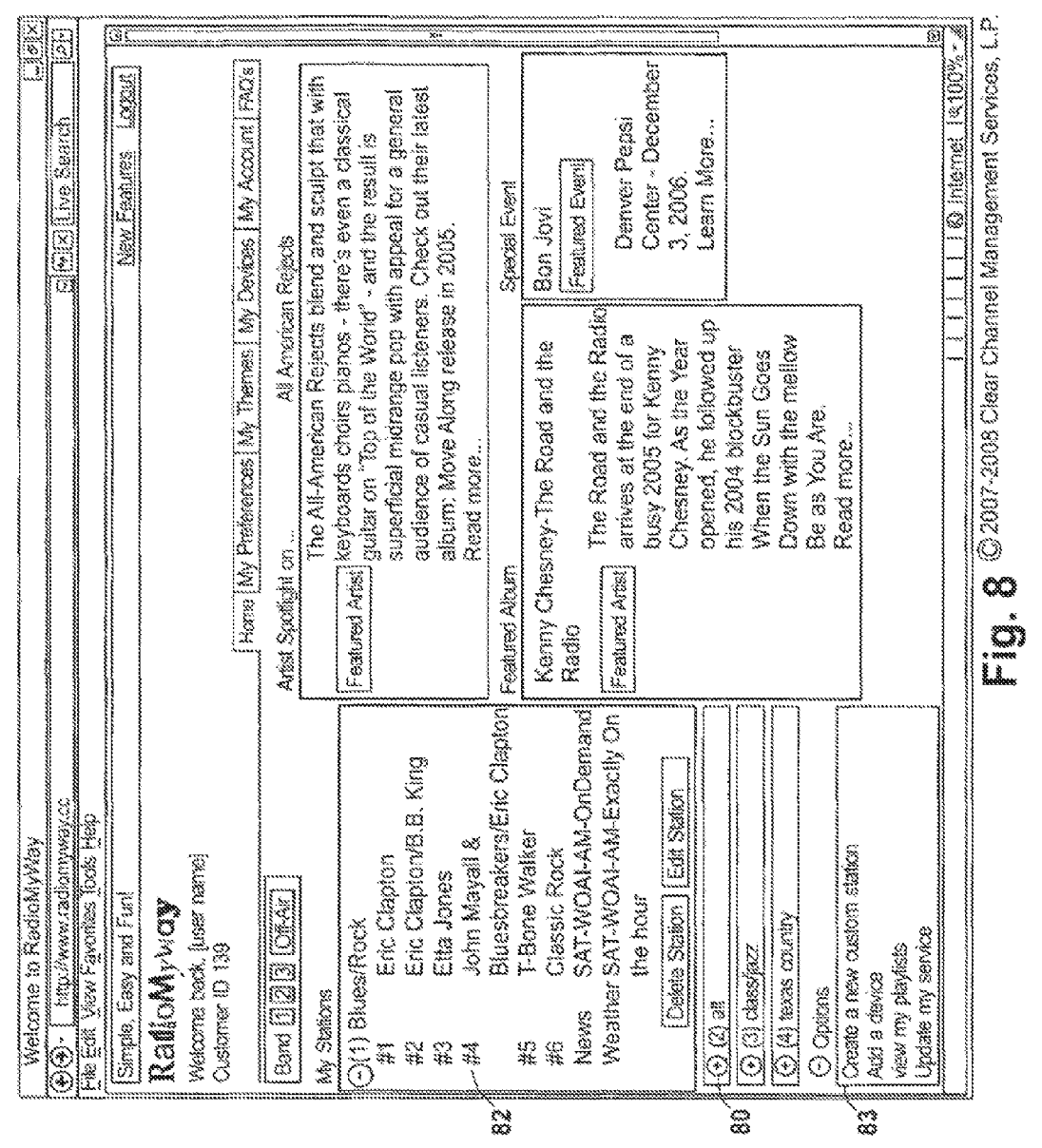

In that manner, a user may specify a number of different themes, and associate a theme with one or more stations. After having defined one station, a user may elect to define further stations by going through the process described above. In the embodiment of FIG. 8, the user has, for the band 1, set up four stations named "Blues/Rock," "alt," "class/jazz" and "Texas Country," respectively. The user may be provided with various controls that may be used to view the station details. In this embodiment, clicking on the "$" 80 button may allow a user to expand the list of preferences pertaining to that particular station. For example, in the "Blues/Rock" station assigned to band, a user may see a list of preferred artists 82, and the radio stations from which perishable content is drawn. Other options may be provided for a user as seen in the "Options" field 83, such as an auction for creating a new custom station, an option for adding a new listening device, an option for viewing play lists, and an option for changing service to a new subscription level. Also, the central server 10 may provide on a user's "homepage" additional advertisements, music features, event listings for a particular region, and other information that may be of interest to the user based on the user's profile.

Figure 9:
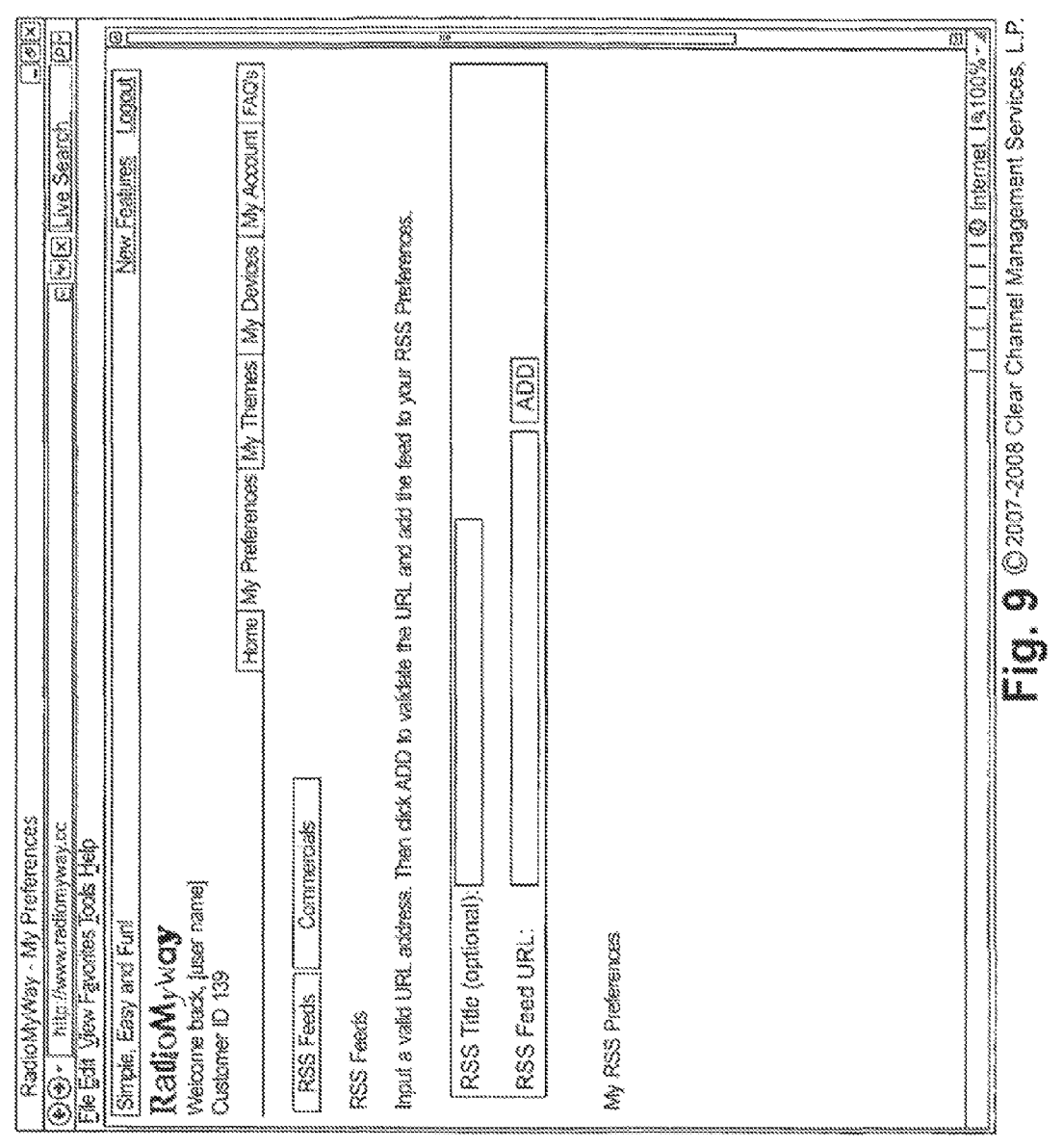

The user may also elect to have content incorporated into a station from an RSS feed, as depicted in the embodiment of FIG. 9. In this embodiment, a user may enter the title of an RSS feed, and specify at the RSS URL. In that way, the RSS feed may be added to, or used in place of the typical NWTS perishable content. The RSS feed may provide, for example, a podcast of a long format talk show or an opinion piece, or blog entries or audible news headlines.

Figure 10:
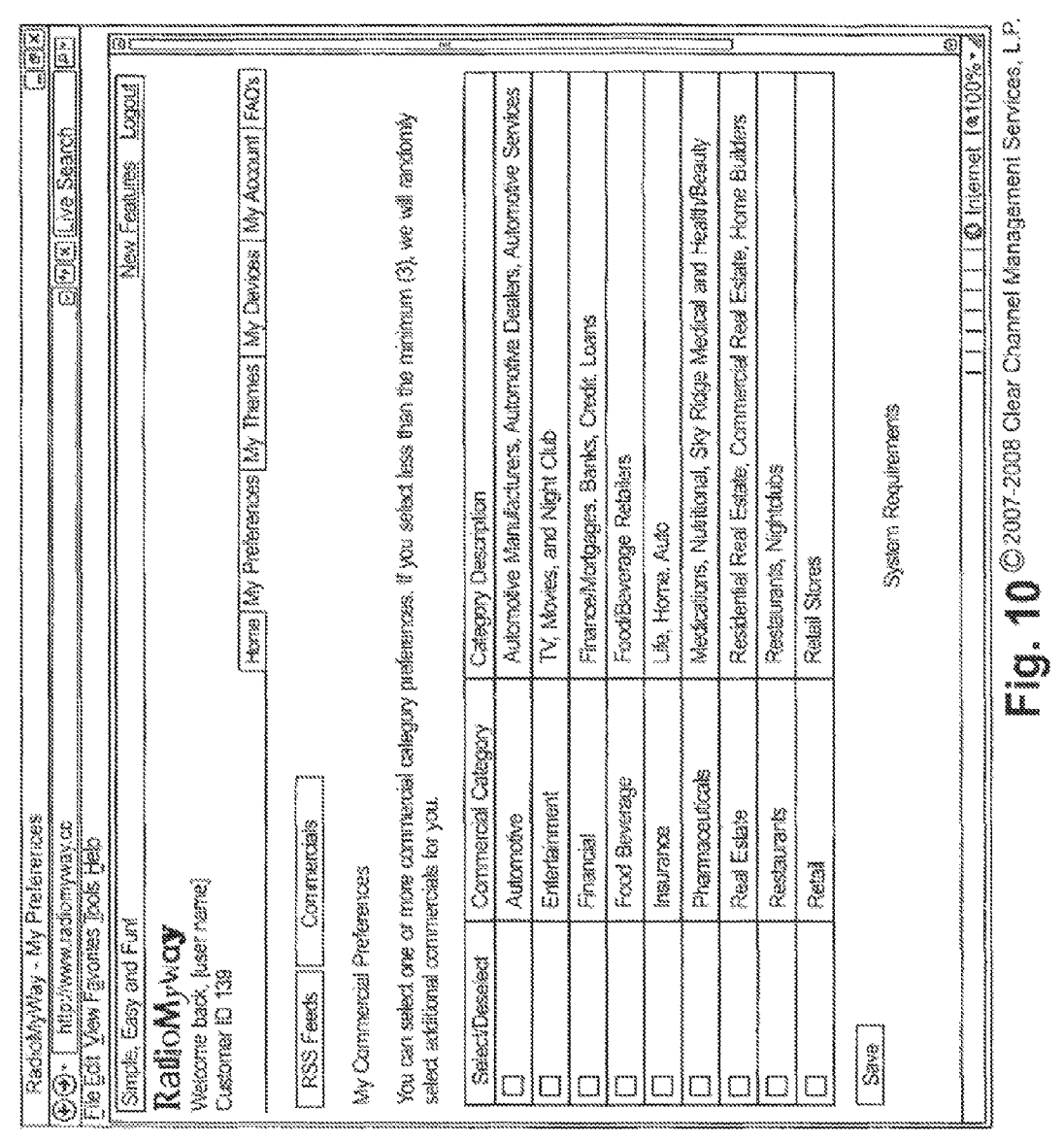

Additionally, a user may specify which types of commercials from one or more categories to listen to. In the embodiment of FIG. 10, a user may be provided with various advertisement categories, including "Automotive," "Entertainment," "Financial," "Food Beverage," "Insurance," "Pharmaceuticals," "Real Estate," "Restaurants" and "Retail." Thus, depending on the subscription level, when a commercial is played, commercials may be drawn from the selected categories. Also, the application may be configured to select commercials at random from various categories if the user does not select enough categories. Those skilled in the art will recognize that the amount and format of commercial content may be based on the user's subscription level, and may further be defined by the content distributor. Commercials may be drawn from any source and may be directed to any particular demographic. In one embodiment, commercials may be national, and provided by the content distributor. In other embodiments, the content distributor may incorporate local advertisements in specific markets. For example, a user may desire to hear commercials only from the geographic location in which he resides.

In some embodiments, perishable content and commercials may be selected for playback across various stations. In other words, a user's perishable content selections and commercial listening selections may apply to one or more stations in one or more bands. Thus, for example, a user may listen to news content from WOAI-AM whether listening to a country music station, a rock station, a jazz station or blues station without having to designate news from WOAI-AM separately for each of those stations. The number of commercials played during any given hour may depend on the user's subscription level. For example, if a user has a free subscription, a block of four commercials may be played three times an hour. If a user tries to skip a commercial, the commercial may be played again until the user listens to the entire commercial.

Figure 11:
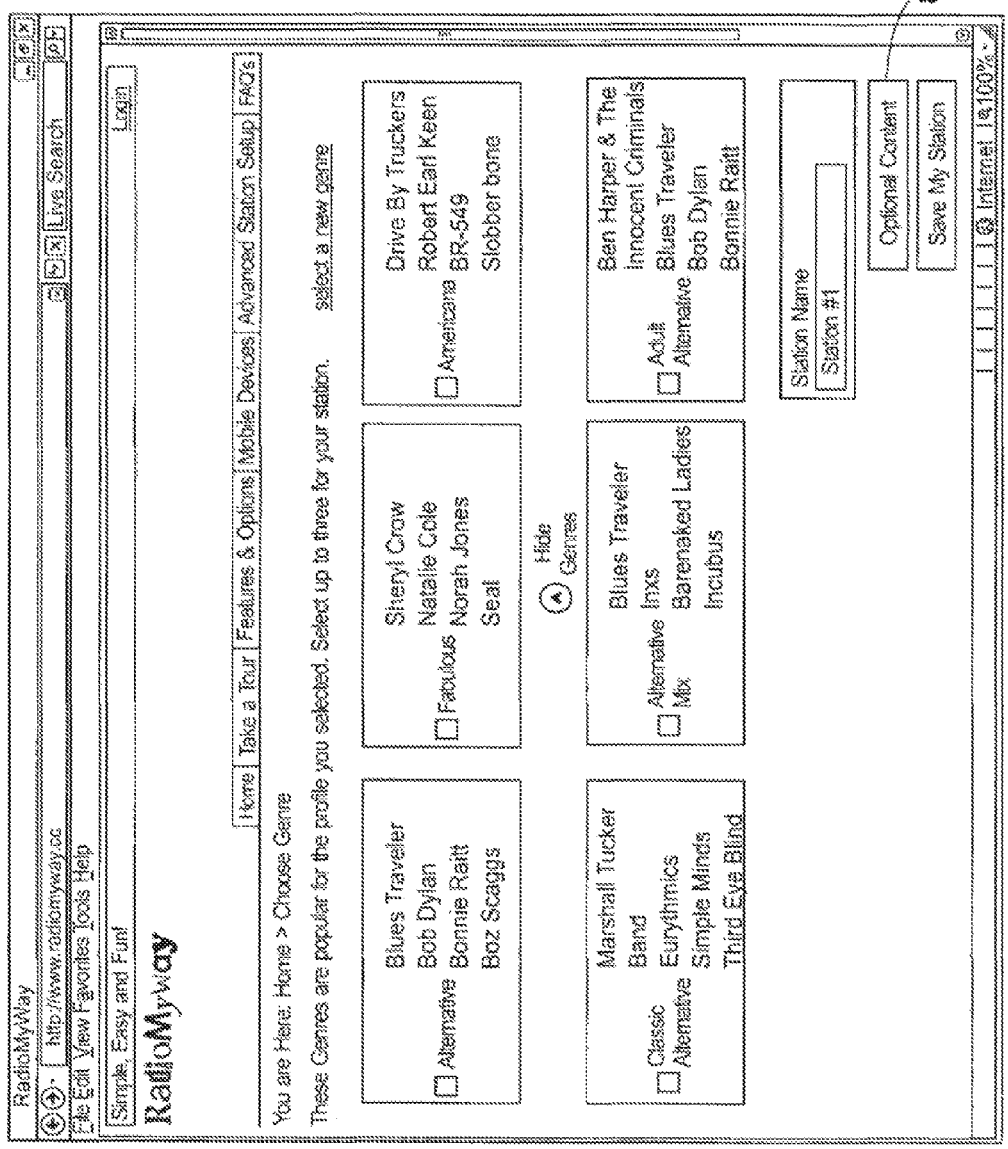
FIG. 11 depicts an embodiment of a screen that may be provided for a user to select preconfigured radio-like stations.

In other embodiments, a user may elect to listen to fully- or partially-configured stations that may be provided as shown in the embodiment of FIG. 11. A central server 10 may provide a number of stations that are popular with other users having a similar profile. During setup, a user may be provided with the opportunity to choose genres that may be of interest, and define various stations according to the genres provided. Those having skill in the art will recognize that a station may have multiple genres associated with it, whether the station is customized by the user as described above, or selected from a list of fully- or partially configured stations. That way, a user may quickly begin listening to a selection of music within a genre if the user is relatively unfamiliar with, for example, the various artists within that genre. The user may also click on an "Optional Content" button 84 to set up a perishable content theme as described above.

In some embodiments, the content distributor may provide a web page that provides the user with historical detail, pertaining to his account, including payment history, played content, user feedback on the played content, etc. The web page may also provide a history of such fees and history of shopping cart related purchases. The web page may further provide a way for users to purchase played content. The web page may further provide a way for users to search for played content by title, album, artist, or any other content identifying criterion.

In still other embodiments, a user may establish a station with content wholly or partially drawn from the user's (or another's) personal music library. A user may provide a content distributor with access to a personal music library, and specify a location of the personal music library. The content distributor may further provide a way for the user to search his personal music library and designate content for inclusion in a station. The content distributor may retrieve content from personal music library according to preferences specified in the user profile or otherwise specified by the user. For example, if the user desires to establish a station of country music drawn from his personal music library, the user may designate certain music from the library for the content distributor to use, or rely on the content distributor's skill in choosing an appropriate mix of music from the personal music library. For example, a content distributor may rely on metadata associated with music in the personal music library to identify suitable selections. The content distributor may arrange suitable music using any suitable professional broadcast scheduling software to create pleasing transitions between songs, e.g., cross-fades and voiceovers, and provide the arranged music to the listener for playback in connection with the chosen station. For example, the central server 10 may rely on professional broadcast scheduling software, such as NexGen from Prophet Systems Innovations, to adjust the relationship between songs to incorporate cross fades, lead-ins and lead-outs. The server may further use a rule-based approach to provide the user with a varied listening experience. In some embodiments, the content provider may mix music from the personal music library with perishable content and commercials, in the manner described above. The content provider may also provide the user with the ability to skip around within the playlist that the content distributor has arranged, or to shuffle the playlist into a different arrangement.

Of course, if the user did not want to provide a central server 10 with access to his computer system or mobile listening device, the user could simply upload his personal media library or information about his personal media library to the central server 10 so that the central server 10 may use professional broadcast scheduling software to arrange the media into a playlist having audio properties and content specified by the user.

In another embodiment, a user may incorporate music from a personal music library into a preconfigured station, or into a station configured according to the user's preferences as described above. For example, a user may desire to add music from a personal music library as part of a music playlist generated by the content distributor. As part of setting up an account, a user may thus provide access rights for the central server 10 to access the user's personal media library.

In utilizing a user's personal media library, the central server 10 may verify, using for example, DRM techniques, that the user legally owns the collection of audio content in the personal media library. In various embodiments, a user may organize or manage his content by using a content management application, such as iTunes or Windows Media Player. A user may furthermore have arranged some of that content into playlists or otherwise created a desired listening experience. Thus, a user may have the option of including such playlists as part of a station content. In other words, a content distributor may incorporate content that has already been arranged by a user. In some embodiments, a central server 10 may evaluate such user-created play lists, and use information about such arrangements in creating a station listening experience. For example, a central server 10 may evaluate the tempo changes from song to song in the user created playlists, and arrange the songs in a station playlist to approximate the tempo changes.

In yet another embodiment, a user may generate content for playback on a given station. For example, a user may generate content, and upload it to the publishing server 30, and specify that the content distributor include that content in a station playlist. Alternatively, the user may generate content and add it to his personal media library for inclusion in a station playlist as discussed above. In yet another alternative, a user may generate content and uploaded directly to the content server 10 for inclusion in a station playlist. Such user generated (or user-created) content may be, for example, a user's own attempt at DJ chatter, or a humorous faux-news report. User generated content may also include content generated by other users. For example, as described in more detail below, the publishing server 30 or central server 10 may contain a variety of user-generated content, and a user subscribing to such content may be able to select such content for inclusion in a station play list.

Content Player

Figure 12:
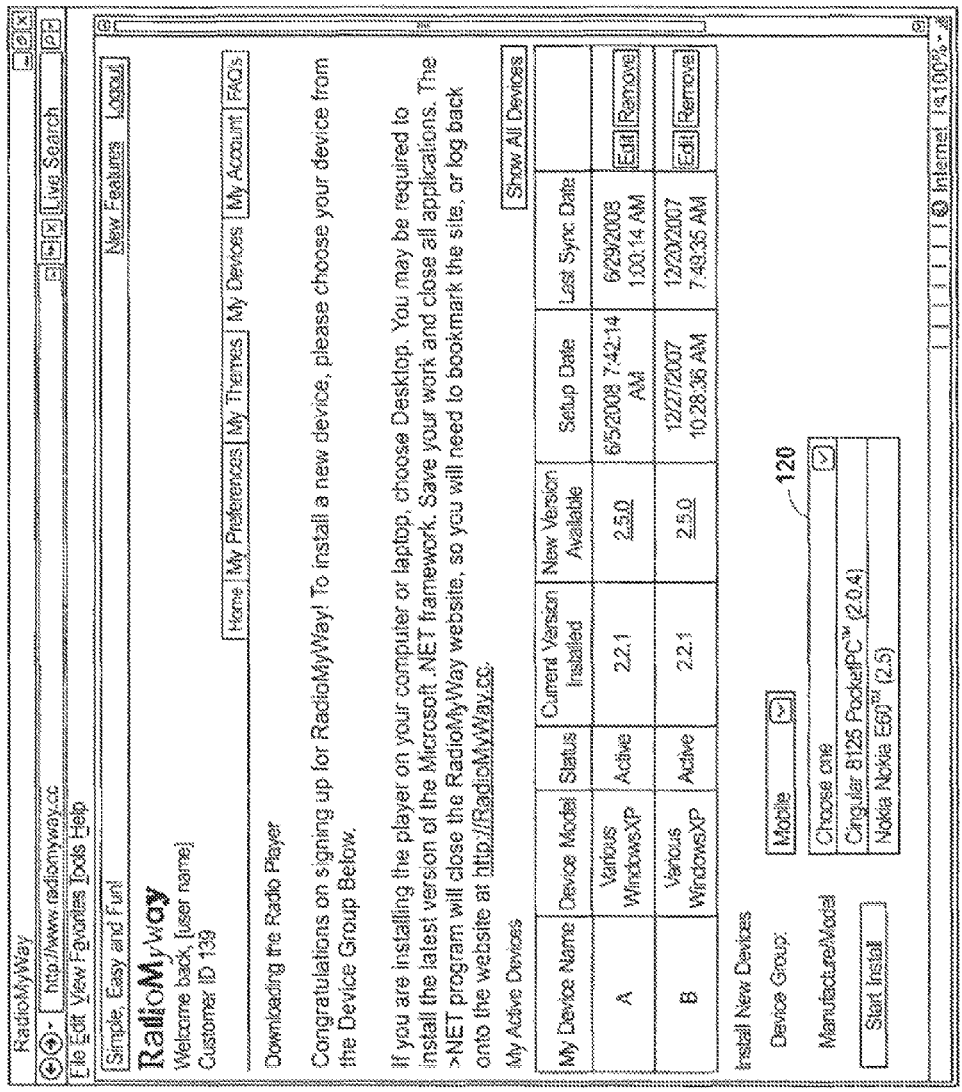
FIG. 12 depicts an embodiment of a screen that may be provided for a user to obtain a content player and specify devices for content player use.

As may be seen in the embodiment of FIG. 12, after the user sets up an account, the content distributor may provide the user with the option of downloading a virtual content player adapted to play content according to the stations configured by the user. The media player may be configured to appear similar to a typical non-virtual radio dial. The content distributor may provide such a media player as a web-based media player from the central server 10. A content distributor may provide a media player in any suitable way, such as by bundling media player, together with other software applications, or factory installing the media player on a mobile media device.

In the embodiment of FIG. 12, users may have the option of downloading a content media player to one or more devices. For example, a user may download the media player to a desktop PC, to a laptop computer, and to a mobile phone. As we discussed below, the user may listen to his stations on each of those devices, and seamlessly switch between listening to those devices. In some embodiments, the content server may evaluate the configuration of the device onto which the media player will be loaded in order to determine if the device meets the requirements to run the media player application.

Figure 13:
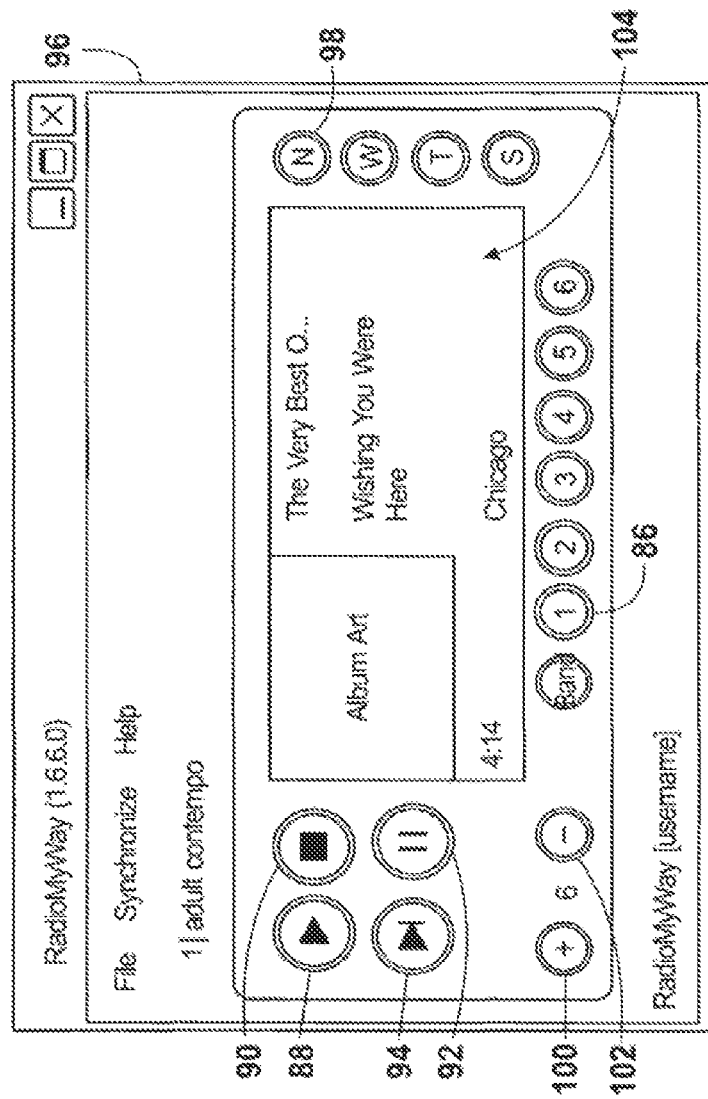
FIG. 13 depicts an embodiment of a content player interface.

FIG. 13 depicts an exemplary virtual radio player interface or content player 96 adapted to play content according to the stations configured by the user. In this embodiment, the interface may provide a number of radio buttons by which the user may listen to the different stations that the user has set up. For example, the user may select Band 1, with which the "Blues-Rock" station is associated, by clicking on the "①" button 86. The user may then click on the "▶" button 88 to begin playing the desired content. Likewise, the user may click on the "■" button 90 to stop play, click on the "❙❙" button 92 to pause play and click on the "▶❙" button 94 to skip to the next song. In one embodiment, the central server 10 may allow the user to skip as many songs as the user desires. Preferably, a user will not be allowed to skip commercials. The user may switch between different bands to listen to the different stations.

To listen to perishable content, the user may either wait until the time specified by the user, e.g., at the top of the hour or at a time certain, or play the perishable content on demand by clicking one of the buttons on the right-hand side of the player display 96. For example, if a user clicks on the "N" button 98, news from the selected local station will immediately begin playing. The "N" 98, "W", "T" and "s" buttons on the right side of the media player 96 may be associated with news reports, weather reports, traffic reports and sports reports, respectively. In various embodiments, those buttons may be assignable (by the user or content distributor) to other types of perishable content, and that other buttons may be provided.

In this example, the user interface may also allow the user to rate the song that is being played on a scale of 1 to 10. The user may click on the "EB" button 100 to raise the rating, and click on the "9" button 102 to lower the rating. Rating the songs in such a way allows the application to adjust the song mix, according to the user's preference.

Figure 14:
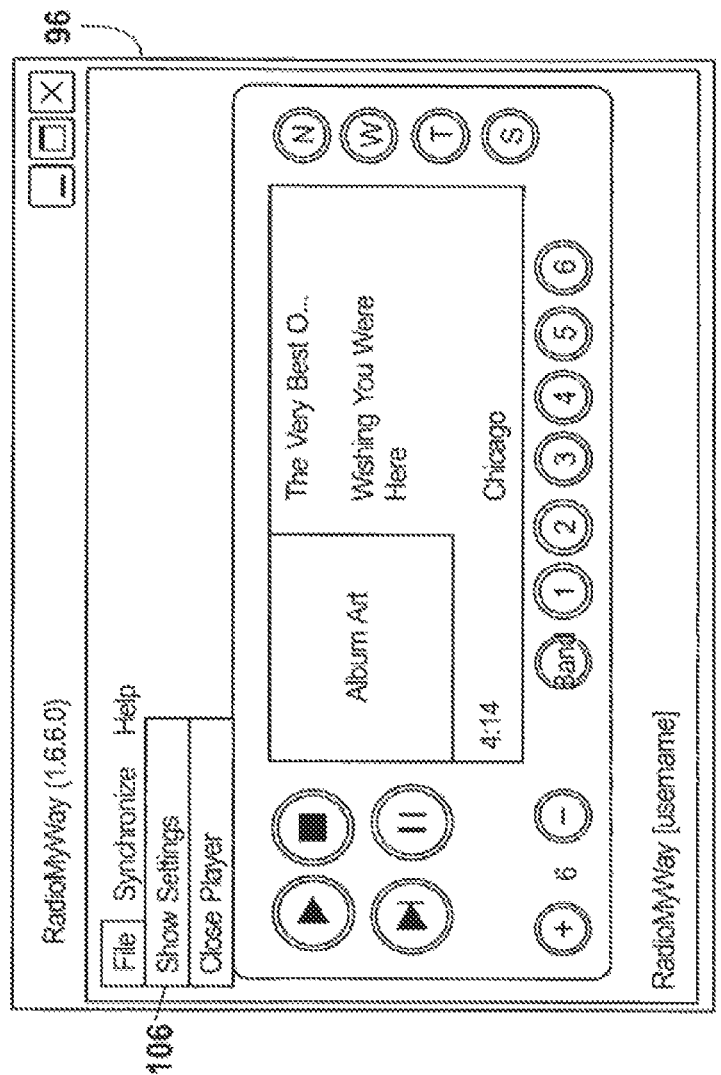
FIG. 14 depicts the settings menu of the embodiment of FIG. 13.

The radio player interface also provides a display area 104 in which the song title, artist and duration of the song may be displayed. Other information may also be displayed, such as the album in which the song may be found, and the album cover art. Additionally, artist information may be displayed. In one embodiment, the user may click on the displayed album cover, which will then launch a web site from which the user may purchase the album. In one embodiment, a content player may incorporate a "Buy it Now" function to allow a user to click on the song title, which will then launch a web site from which the user may purchase the song (or other content, as the case may be). As noted above, "shopping cart" functionality may be provided to facilitate such purchases. In one embodiment, the user may click on the artist's name, which will then launch the artist's web site. The display area of the radio player interface may also display a scrolling "marquee" or "ticker" of information, or visually inform the listener of an alert that may pertain to the geographic location of other perishable content. For example, a NOAA storm warning may scroll across the display area to warn the user of inclement weather conditions in the geographic location to which the perishable content pertains. As shown in FIG. 14, using the radio player interface 96, a user may also view and adjust the player settings as indicated at 106.

Figure 15A:
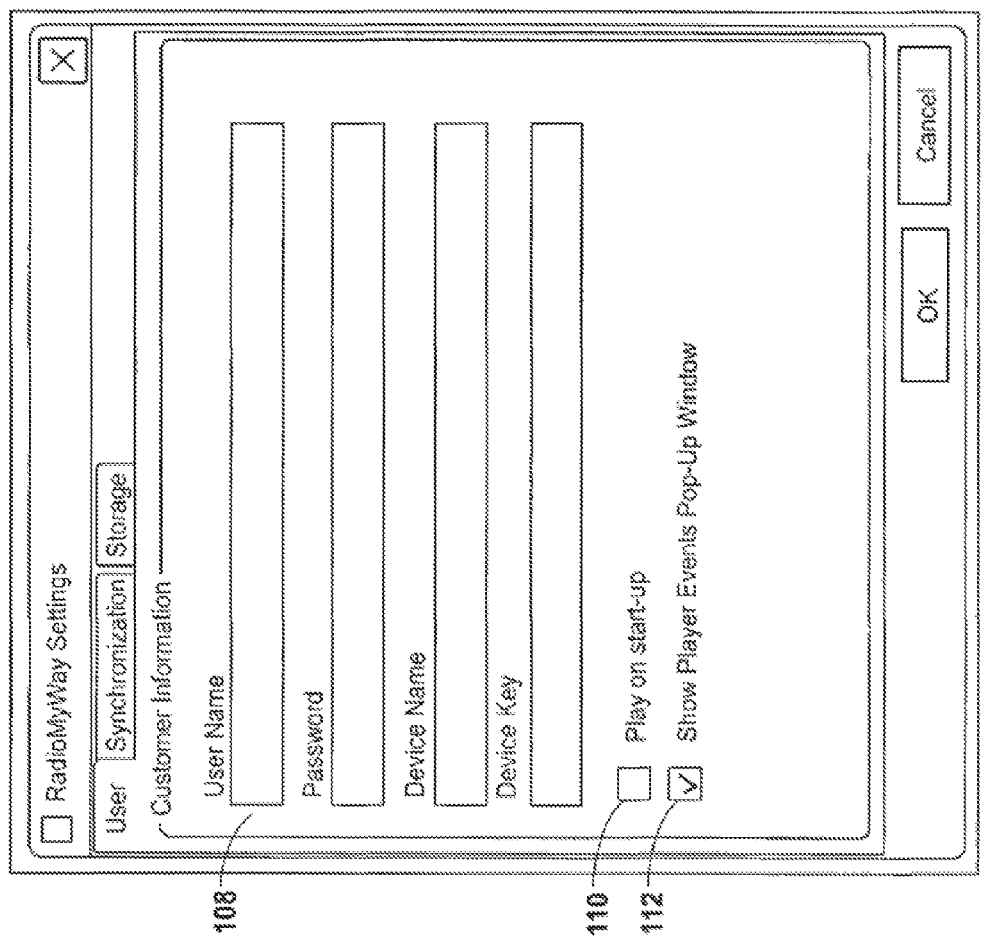
FIGS. 15A-C depict an embodiment of interfaces that may be provided for a user to manage content player settings.
Figure 15B:
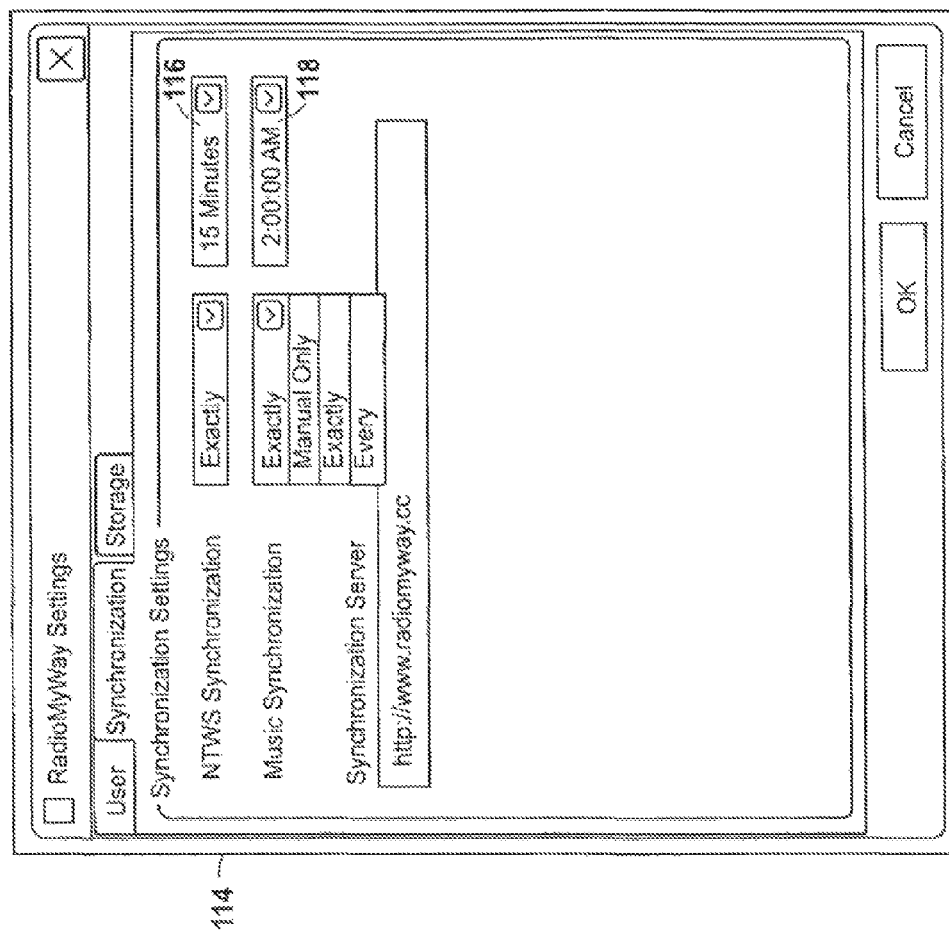
Figure 15C:
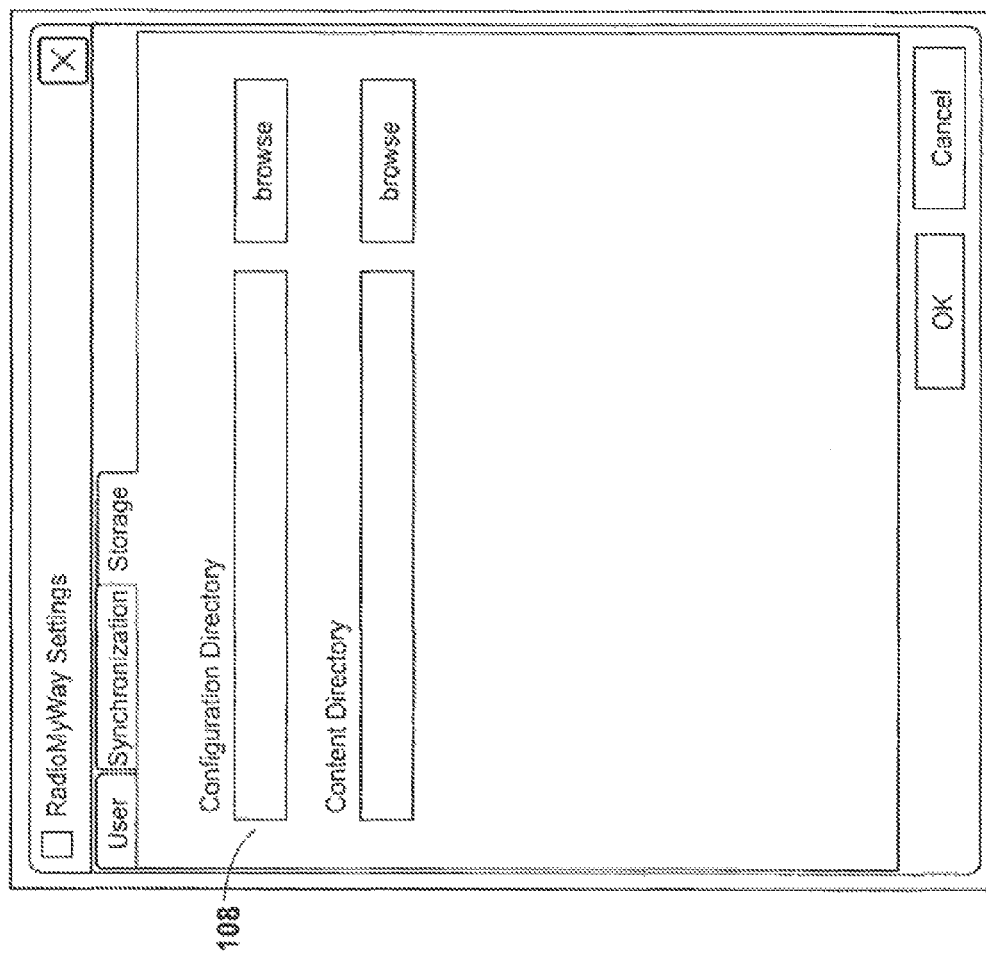

FIGS. 15A-15C illustrate one embodiment of user interfaces for accessing the user settings. A user may verify his account name in box 108 and other information, and designate whether the radio player interface should be launched on start up using check box 110, e.g., when the desktop computer 12 or mobile device 14 is powered on. The user may also specify by using check box 112 whether a window will pop up to indicate to the user that the media player is synchronizing with the central server 10.

Figure 16:
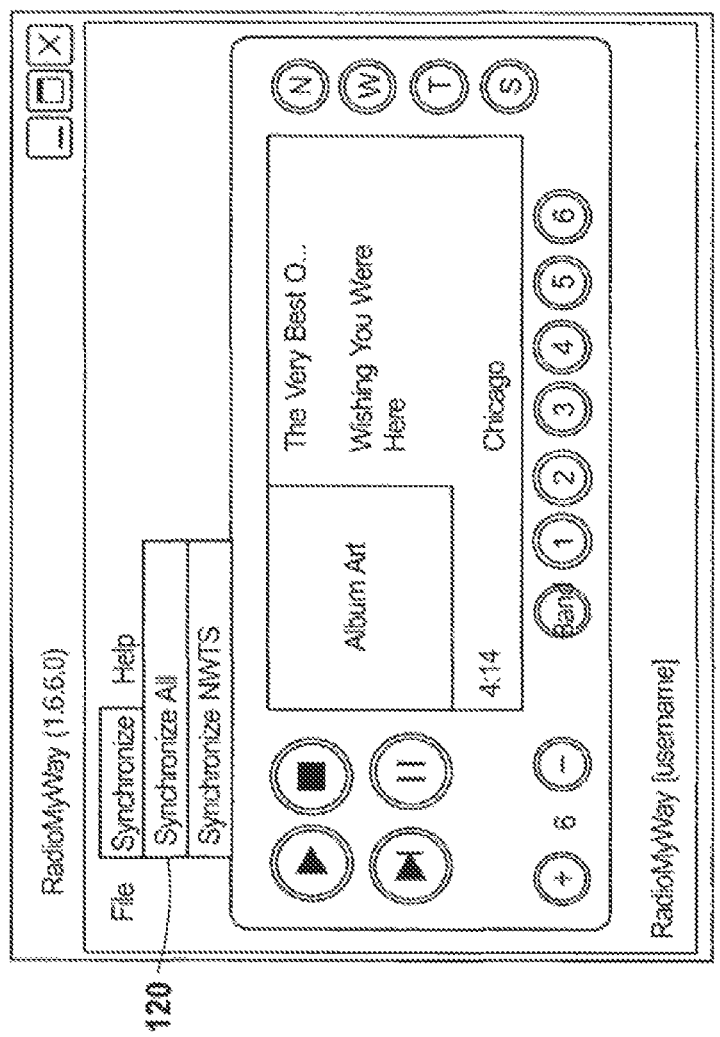
FIG. 16 depicts the synchronization menu of the embodiment of FIG. 13.

Referring to FIG. 16, the user may also verify and adjust the synchronization settings as indicated at 114, and specify the server, e.g., the central server, with which synchronization is to take place. Likewise, the user may specify whether synchronization takes place at a particular time, whether the user may manually force synchronization, or whether synchronization should take place at particular time intervals. In this example, the user may specify that the perishable content should be synchronized every 15 minutes using drop down menu 116, i.e., the media player should check for new perishable content every 15 minutes. The user may also specify, for example, that the music selection should be synchronized or updated at exactly 2 a.m. each day using drop down menu 118. Those having skill in the art will recognize that synchronization may be two-way. The application may synchronize with the central server 10 to obtain fresh content, and a central server may receive updated user configuration information. Generally, the synchronization process obtains station schedules from the central server 10, and downloads or streams the needed music and commercial content to the player. As users listen to their stations, the player may check for the most recent versions of their configured perishable content and play it. Each synchronization may update the station schedules on the player by replacing the played portion with new music content. During synchronization, the history of the songs played on the station is returned to the central server 10 so it can be reviewed by the user and be available for overall application reporting purposes. Once synchronization is complete, additional schedule content may be generated to replace what has been put on the player. That new schedule content may then be available for subsequent synchronization.

Unlike playback of content, synchronization requires connectivity to the central server 10 and its processes, and can only take place when the user device is connected to a network. Those having skill in the art will recognize that such connection may be wireless. Various levels of synchronization may be provided depending upon the speed and quality of the network connection. The radio player interface may also provide a way for the users to force a synchronization of the player with the central server 10. In the embodiment of FIG. 16, a user may synchronize with respect to all content, or may synchronize only with respect to the perishable content using drop down menu 120.

The user may also verify or designate the computer directory in which various configuration files are to be stored, as well as verify or designate the computer directory in which the music for the radio "station" is to be stored. For example, while the media player is playing content, the media player records the history of content played and stores that history record in the designated computer directory. The play history may also include information about the device on which the content was played. In that manner, the central server 10 may track when content was played, on which device the content was played, which songs were skipped, which perishable content was used, song ratings, and the like. During synchronization, the play history may be provided to the central server 10.

Figure 17:
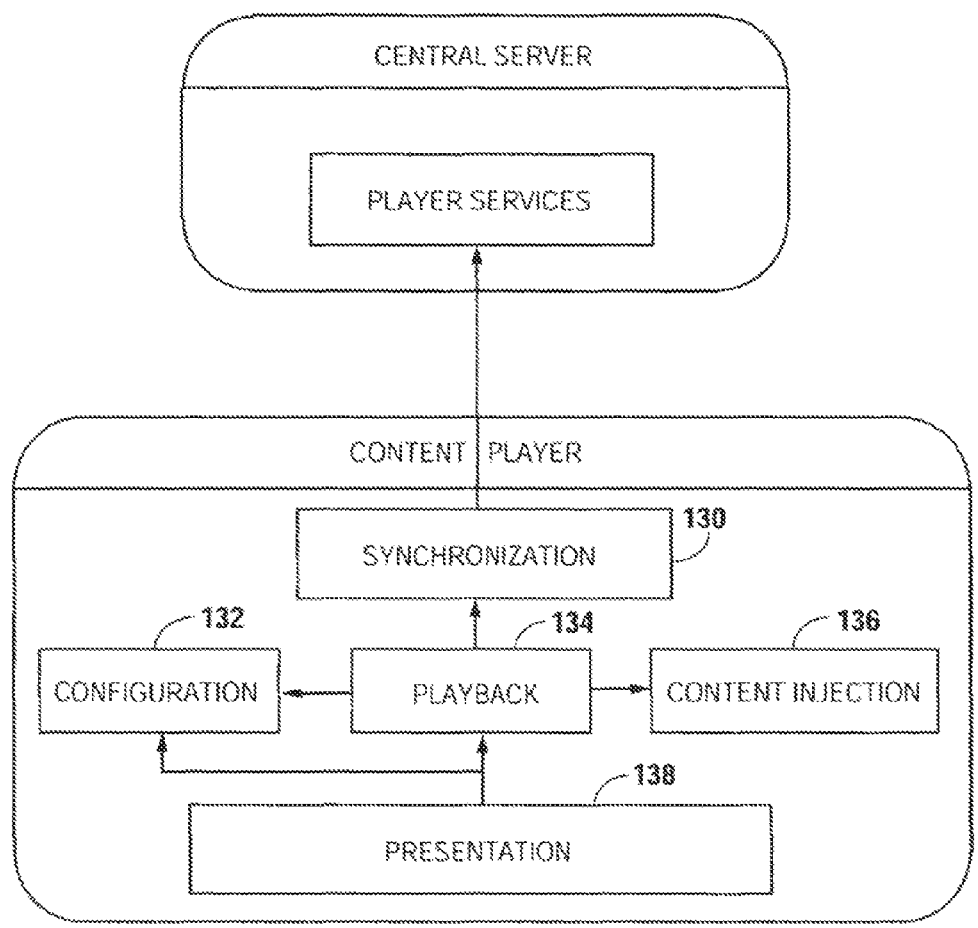
FIG. 17 depicts an exemplary content player architecture.

In one embodiment, a content player may be provided with the exemplary architecture shown in FIG. 17. A content player may include five primary components, namely, a synchronization component 130, configuration component 132, playback component 134, content injection component 136 and presentation component 138.

A synchronization component 130 may run as a background task and be responsible for obtaining user subscription settings and downloading user content. The synchronization component 130 may mostly sleep, waking up periodically to determine whether it should check for updated perishable content to perform an entire synchronization. This determination may be based on user configuration.

A configuration component 132 may be responsible for managing access to user and system configuration information. The system configuration information may be updated during each synchronization. User configuration data may be edited by the user and stored locally, e.g., as XML.

A content injection component 136 may be responsible for evaluating the current state of the system to determine whether commercials or perishable content should be injected or not. Near the end of each song, the playback component 134 may call the content injection component 136 to see if it should add commercials or perishable content to the top of a playlist. The injection of commercial content may be based on system settings that are associated with a user's subscription type. The injection of perishable content may be based on settings that the user specifies either via a PML application/website or other content distribution system website.

The playback component 134 may control the current station playlist and the audio playback threads. It may use multiple audio playback threads to handle various radio-like transitions, e.g., the cross-fading feature. For example, a song may be played with the first audio playback thread; the thread will raise an event when the song is nearing its end. This event may signal the playback component 134 to check for injectable content then play the next item in the play list by launching a second audio playback thread.

A presentation component 138 may be responsible for rendering a player interface to the user and reacting to user actions. The presentation components may also work closely with the playback component 134 so that it may correctly display the current playback state.

Mobile Devices

Figure 18:
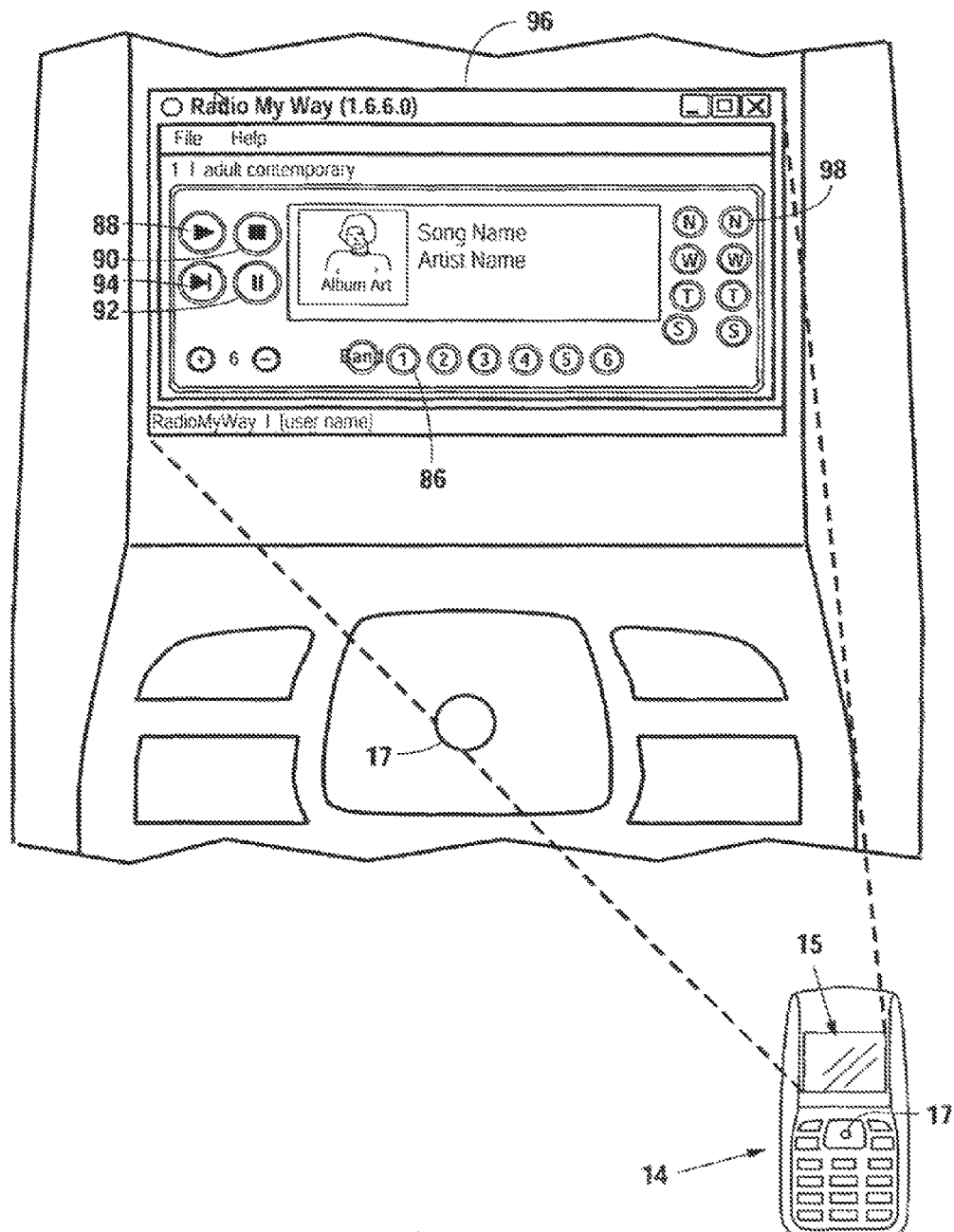
FIG. 18 depicts an embodiment of content player interface for a mobile phone.
Figure 19:
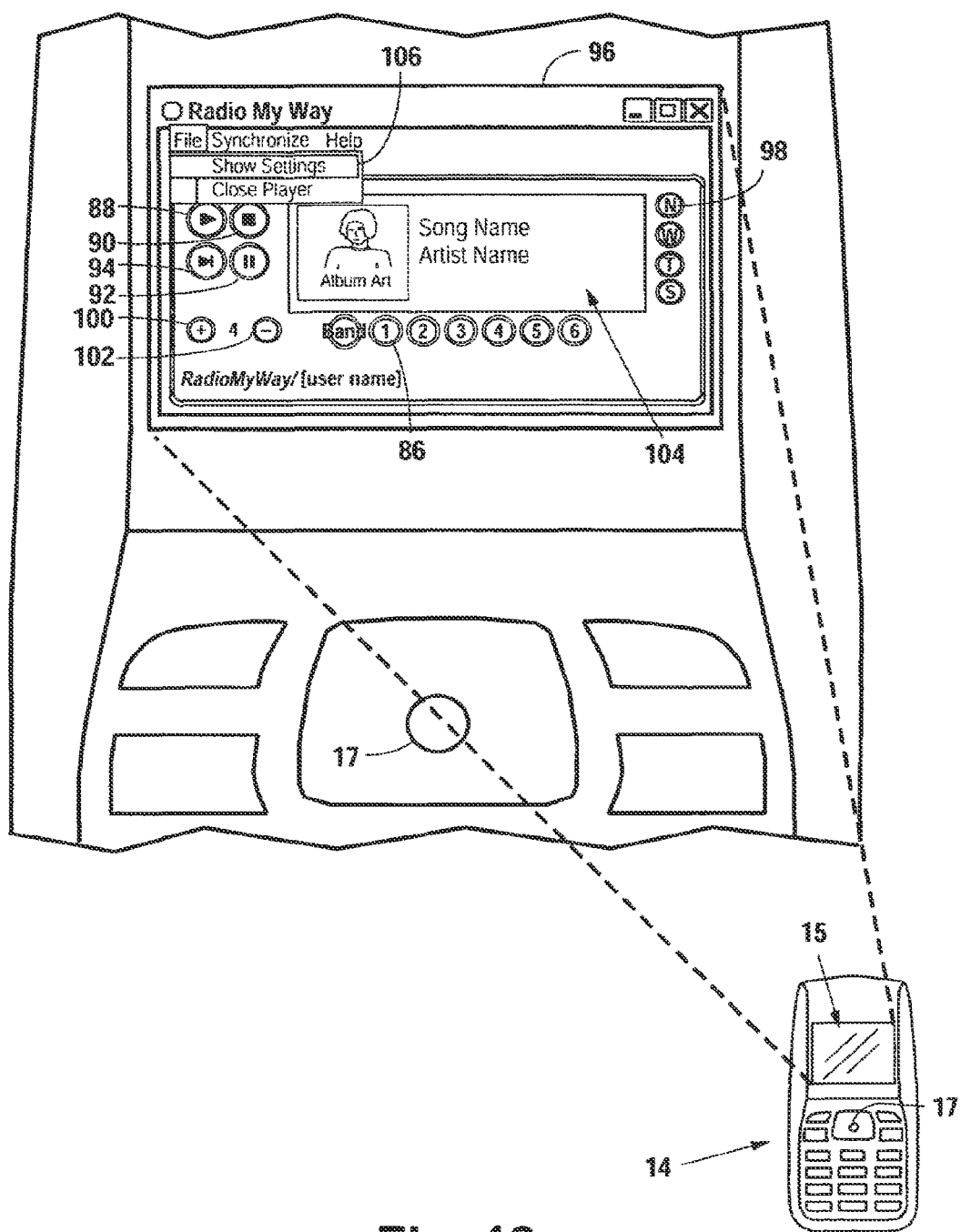
FIG. 19 depicts the settings menu of the embodiment of FIG. 18.
Figure 20:
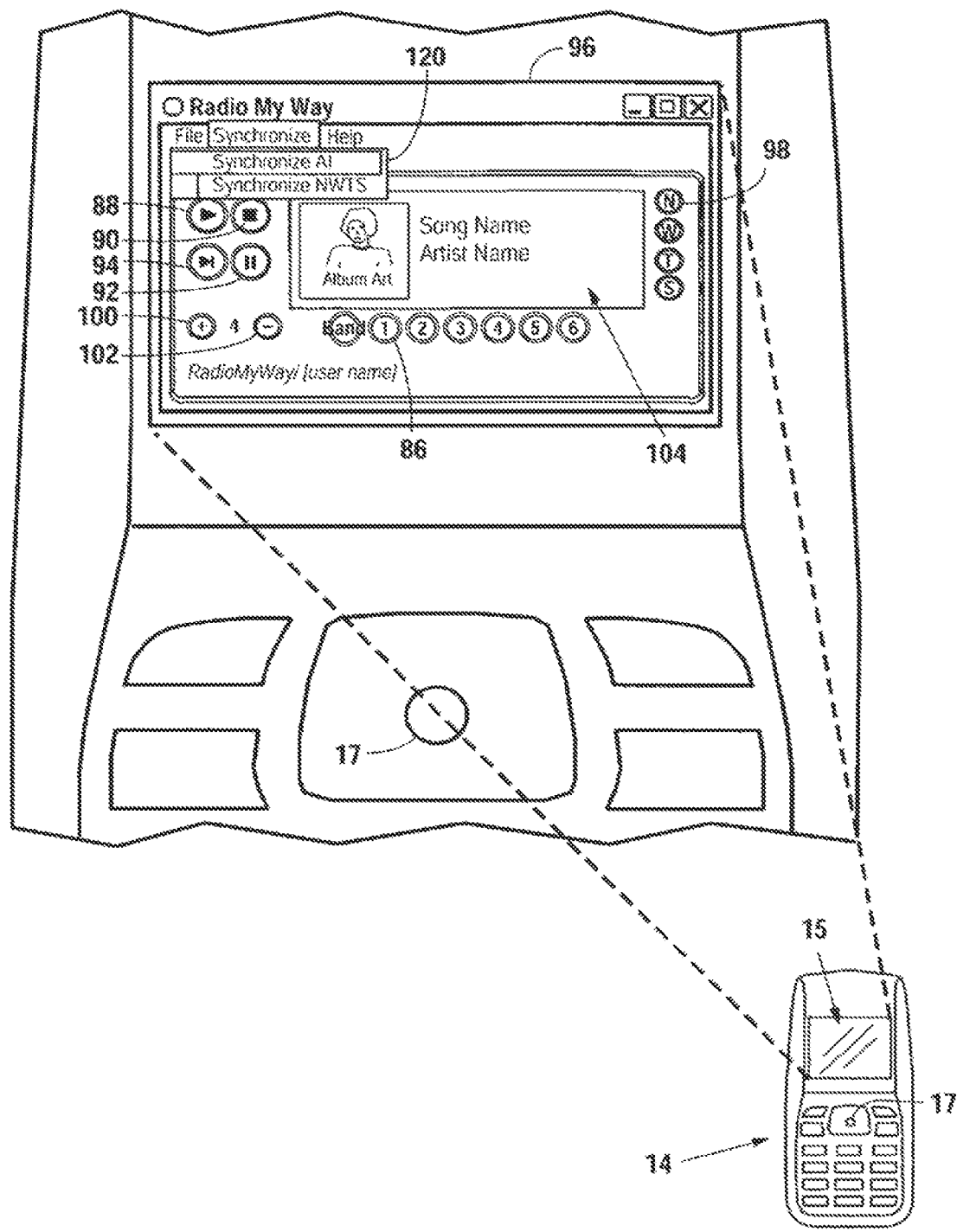
FIG. 20 depicts the synchronization menu of the embodiment of FIG. 18.

In various embodiments, a content player may also be provided to a user's mobile devices. In the embodiments of FIGS. 18-20, such a mobile device comprises a mobile phone. In that embodiment, a content player application may be provided from the central server 10 over a cellular telephone network to a user's cellular phone 14. The application may be adapted to run on a mobile phone operating system, such as, but not limited to the Windows™ Mobile Operating System, or a Symbian™ Operating System such as the Symbian™ Operating System 9.1. Likewise, the application for providing a radio-like experience may be downloaded from a central server 10 to a personal electronic device, such as a PDA. The application may be adapted to run on the personal electronic device's operating system. Such operating systems may include, for example, Windows Mobile/CE, as x and Palm as. Also, applications for a mobile telephone and for a personal electronic device may be software sold to or downloaded by user, or provided as already installed on the device when purchased from a retailer. Themes and stations may be set up on a mobile device 14 in the same manner as set up with a desktop computer.

As described above, a user may define the devices on which he is running each instance of the application for providing a radio-like experience. In the example shown in FIG. 12, the user may have two desktop devices, A & B, from which he may access his account. The user may also specify mobile devices, such as cellular phones. Using drop down menu 120 (FIG. 12), in this embodiment a user may specify a mobile device as an additional platform on which to run the application, such as a Cingular™ 8125 PocketPC™, a Nokia™ E60 (2.50), a Nokia™ E70 (2.50), or a PalmTre0700W (2.0.4). A user may be prompted to install the application on the device after choosing the specific device, and an installer application may be transmitted to the user's mobile device 14 (FIGS. 18-20) for installing the application. After the user downloads the application onto the device 14, a user may choose whether to enable manual or automatic synchronization with the desktop instance or with the central server. Such synchronization may allow a user to seamlessly switch from listening to a desktop instance of the application to a mobile device and may be accomplished, in various embodiments, through a wireless Internet connection or some other suitable connection. If the application is installed on the selected device 14, the server may be adapted to recognize the device 14 selected by the user and synchronize content with that device 14, as indicated by the user in set-up (either manually or automatically). Of course, various cellular phones or mobile devices 14 may be adapted to run the application. For example, the application may be adapted to run on a cellular phone or other mobile device 14 having (in example of a Nokia™ E70 cellular phone) 60 MB of memory, a miniSD™ memory card, with a display 15 having an active color matrix and a resolution of 352×416 pixels, and having the following connectivity: Integrated WLAN (IEEE 802.11g) (also known as Wi-Fi), USB (USB 2.0), Bluetooth™ version 1.2, Pop-Port connector (or a similar connector for supporting a hands-free microphone, and stereo speakers), and Infrared. The application may be synchronized using a Wi-Fi connection to or cellular signaling with a network.

Whether the user uses only the desktop application, or uses both a desktop and mobile application, the user may create a single user account (or multiple accounts, if desired) that may be accessed through every instance of the application. For example, a user may be seated at his desk listening to the desktop instance of the radio application, and, if in synchronous communication with the central server 10, continue listening on his mobile device 14 to the radio experience when he leaves his desk. In one embodiment, switching listening from one device to another may be substantially seamless to the user, e.g., there may be very little time lag or play back gap. In various embodiments, the content player interfaces shown in FIGS. 13-16 and 18-20 may be programmed to appear in a display screen 15 of a user's cellular phone or other mobile device 14 such that the user may control and play their personalized radio experience directly from a cellular phone or other mobile device 14. The various buttons in the virtual radio player interface 96, such as, but not limited to, the "G)" button 86, the "iii'>" button 88, the "." button 90 to stop play, the "II" button 92, and the "" "" button 94, may be selected using a joystick, a trackball, or any other hardware component 17 associated with the cellular phone or other mobile device 14. In various embodiments, the number or character keys on a cellular phone or other mobile device 14 may be programmed to correspond to the various buttons in virtual radio player interface 96. A user's cellular phone or other mobile device 14 may have speakers adaptable to play the user's personalized radio experience at a suitable volume such that a user may place the cellular phone or other mobile device on a desk or other surface and listen to the radio station while working, studying or doing some other activity. Alternatively, a user may plug in headphones to a mobile device or use a Bluetooth™ earpiece to listen to his personalized radio experience.

User Created Content

As noted above, content specified for playback on the media player may include user created content. A user may, for example, set up a station solely for playing user created content, or may elect to have user created content inserted as personal content into a station set up for, e.g., music.

User created content may be of any type and from any source. For example, a user may create an audio blog or an RSS feed, record a speech, or read a narrative. Also, organizations, such as schools and business, may create content, such as bulletins, flashes, or news releases, for distribution. With reference to FIG. 2, the user may upload the user created content to the publishing server 30 for inclusion in a common repository. The publishing server 30 may rely on a content database 18 to store the user created content, and rely on virus protection software to screen incoming files. Encryption may also be used to ensure the security of sensitive content.

A common repository, such as that provided on publishing server 30, may comprise a user-built "library" of audio content that may be categorized and organized in various ways for ease of retrieval and aggregation. The repository may grow as users add content (e.g., user-created content) and may be searchable. The user who uploaded a file may specify access restrictions for that file, or audio distribution lists. Other users may search for and retrieve content in the repository (depending on the user's level access), and may further request that content from certain authors be automatically injected into a particular station on their media players. The publishing server 30 may rely on a configuration database 34 to store user profile and configuration information.

Thus, in one example, the system provides a means for registered organizations or users to publish audio content to the repository. For example, a director in a multi-level distributing company or a franchisor may record a motivational message and upload the message to the publishing server 30. The director may further grant authorization for a specific group of users to access the message, or specify that the message be automatically distributed to a group of users at a certain time, or upon occurrence of a certain event. The company's product distributors or franchisees may access the message by clicking on a station set up to receive such content, or retrieve the message by accessing the publishing server 30 and downloading the message.

Other Back-End Functions and Services

In one embodiment, the central server 10 may provide a unique schedule for each station to provide a particular listening experience. Such a schedule may be used as a guideline to play the content of each station, and may contain music content, talk show content, DJ chatter content, radio long program content, commercial content, perishable content, user generated content, and any other content suitable for the station as customized by the user. Preferably, the central server 10 may apply DRM/DMCA rules to content played by the content player. Thus, a content schedule may include rules that force compliance with DRM/DMCA rules. For example, a song by a given artist may be scheduled for play only one time during a scheduled one-hour block of time. The central server 10 may limit which, and how often, content elements may be skipped in a scheduled one-hour block of time. The central server 10 may further track and report content played and skipped to facilitate royalty management. In one embodiment, such royalty information may be provided to a third-party content provider. Content may be counted as played when a user listens to a certain amount of the content. For example, if a user listens to half of a song before skipping to the next song, the song may be deemed to have been played for royalty purposes. The same rules may apply to commercials and talk show content. Preferably, the information may be reported when the user devices synchronize with a central server 10. In various embodiments, the application used to schedule a user's personal media library may be different from the application used to provide the media player interface.

Furthermore, station schedules may be adjusted to accommodate the various capabilities of a device. For example, a user's desktop computer may have greater capacity for and capability of storing and playing content than a handheld device. A content schedule may be provided to different devices with different capabilities, by altering for example, content format and compression ratio.

In one embodiment, synchronization of a user device with the central server 10 may involve a number of activities. Played content based on DMCA rules may be reported to the central server 10. Played content based on DMR rules may be reported to the central server 10. Skip content may be reported to the central server 10. Scheduled subscription content, not already existing on the device, may be copied to the device in the format specified by the user (if there is available space on the device). Content that the user rates or provides feedback for may be reported to the central server 10. If content has changed from subscription to purchase content, DRM rules may be changed with respect to the purchase content before it is downloaded or streamed to the user device. The buffer or storage space in a user device may be checked. Played content may be replaced with new content or a new content schedule. Perishable content may be updated.

Figure 21:
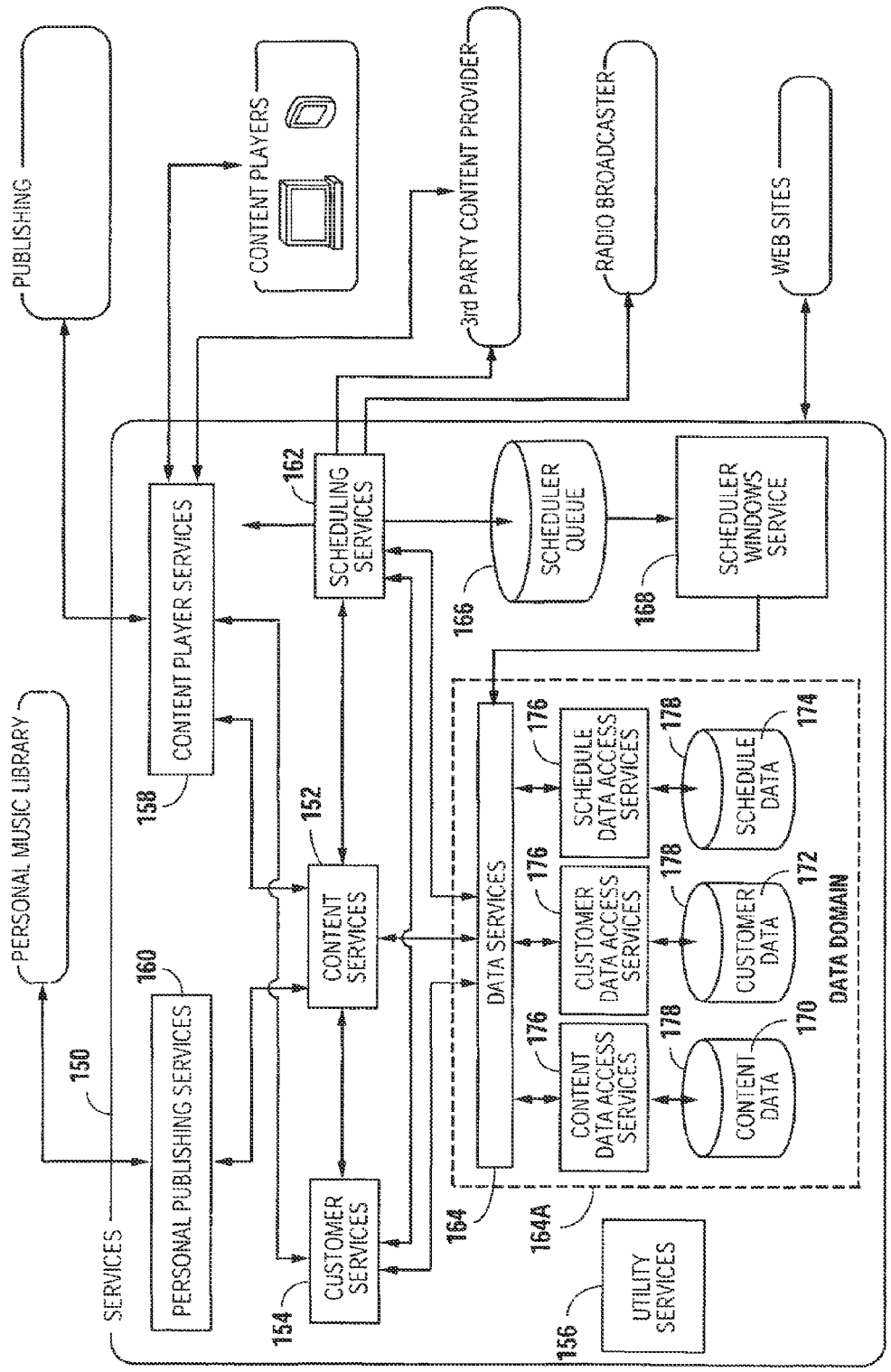
FIG. 21 depicts an embodiment of a functional diagram of a content distribution system services component.

As discussed above, a services component may, in one embodiment, provide a centralized location for accessing common content distribution system business logic and data storage functionality that is needed by all content distribution system components. In the content distribution system services embodiment 150 of FIG. 21, the services component may provide the core of the content distribution system. These services may be grouped into seven independent service centers, namely, Content Services 152, Customer Services 154, Logging Services 156, Content Player Services 158, Personal Publishing Services 160, Scheduling Services 162 and Data Services 164, that each provide unique operational and behavioral functionality. Such division allows each service center to be readily adaptable, easily distributed, and highly scalable. One embodiment of those service centers is illustrated in FIG. 20 and described in more detail below.

Content Services 152 may isolate the process of obtaining content and transforming it into files usable by the content distribution system. This content may be songs, syndicated talk, station programming, perishable, commercial, or most any other type of recoded content. Content Services 152 may obtain content from third party providers, transform the content by transcoding content codecs or container files, and aggregate and cache content metadata to facilitate access to metadata information. By encapsulating this functionality behind a set of generic services, the content distribution system may gain the ability to add or change content providers without impacting other content distribution system functionality.

Customer Services 154 may provide useful business functionality related to a customer, such as login authorization, forgotten login services, and device management/synchronization utilities.

Utility Services 156 is responsible for providing utility functionality for the content distribution system, such as encryption, configuration, service discovery, and logging may be provided here.

Content Player Services 158 may provide the main interface between the content players and content distribution system services. Content Player Services 158 may support synchronization as well as the acquisition of audio content. Service calls to Content Player Services 158 may be authenticated by means of a device key or user I.D. and password validation, or both. Authentication may be used to prevent unauthorized access to audio content.

Personal Publishing Service 160 may provide access to content available on a publishing server. The content player and PML applications may communicate with the Personal Publishing Service 160 to obtain content meta-data and the actual content item. This service may be responsible for authenticating a user with appropriate credentials to a publishing server.

Scheduling Services 162 may provide a set of services needed for creating, maintaining, and delivering schedule content for each station for subscribing users. To reduce this risk of throughput bottlenecks, Scheduling Services 162 may be segmented into the basic services for obtaining and adjusting schedules, and a Scheduler Queue 166 of prioritized requests that may be read and processed by a Scheduler Windows Service 168. This segmentation may serve to isolate the schedule generation process from the basic service needs. Thus, changes or reimplementation of a schedule generation process may occur without impacting other areas of the architecture. When Scheduling Services 162 receives a schedule generation request, instead of immediately building new schedule content, it may forward the request on to the schedule generation queue 166. This queue may be constantly monitored by the Scheduler Windows Service 168. When the Windows Service 168 discovers a request within the Scheduler Queue 166, it may retrieve it and proceed to generate the schedule information as specified.

Data Services 164 may ensure the consistency and availability of data to all content distribution system services. Data may, of course, include content data 170, user data 172, schedule data 174, and other pertinent data. Data Services 164 may serve as the data abstraction layer for data and provide for the modeling, transformation and transactional synchronization of the data within and across services. Data can be transported, persisted, and used in a variety of formats, e.g., XML, and may be programmatically used by serializing the data into instances of objects. Data Services 164 may essentially hide the persistent state of the data behind the services, which means that the persistence mechanism can be changed without impacting the rest of the content distribution system.

In various embodiments, data may take a variety of forms. In one embodiment, a message architecture may be used to manage data throughout the entire content distribution system, e.g., from initial entry, storage/persistence, modification, transfer/messaging, to eventual reporting and archival. For example, XML or serial representations of XML may be used to insure the integrity and safety of data through data persistence or storage, data transport or transfer, and data usage. Thus, Data Services 164 may transform data from, for example, a transport model into a persisted model (or vice versa), e.g., for storage by Microsoft SQL Server 2005. Data Services 164 may also ensure transactional synchronization of data updates.

By implementing certain functionality behind a single set of services, Data Services 164 may provide a single point of access for all read, write, aggregation, and transformation operations. This may ensure that data is pulled from the correct secure source and it is interpreted consistently, and correctly. Without the Data Services 164, many of the components of the content distribution system may directly communicate with, e.g., an SQL Server, and data integrity and security may be compromised.

Also, implementing a Data Services 164 component may enhance scalability. Typically, databases are easily scaled up (buying faster and larger host computers), but are not easily scaled out. The architecture 164A of Data Services 164 may provide a scale out approach by providing a single set of Data Services that may be invoked by other content distribution system services, as well as a group of content-based Data Access Services 176 that actually interface with content databases 178. Thus, as the load on the Data Access Services 176 increases, they can be scaled out to multiple machines (and even clusters), each with their own segment of the databases. This scaling out is more cost effective than scaling up.

Further, this Data Services 164 approach may also provide a non-tableized view of the data. Data Services 164 may be functionally-based services that ask for or provide large chunks of data that fit within the model exposed by the data architecture 164A. Therefore Data Services 164 may be oriented towards other service components. The Data Services 164 may then transform these requests into calls to the underlying Data Access Services 176 that are more table oriented and fixed to basic CRUD (Create, Read, Update, Delete) operations.

Personal Music Library Architecture

Figure 22:
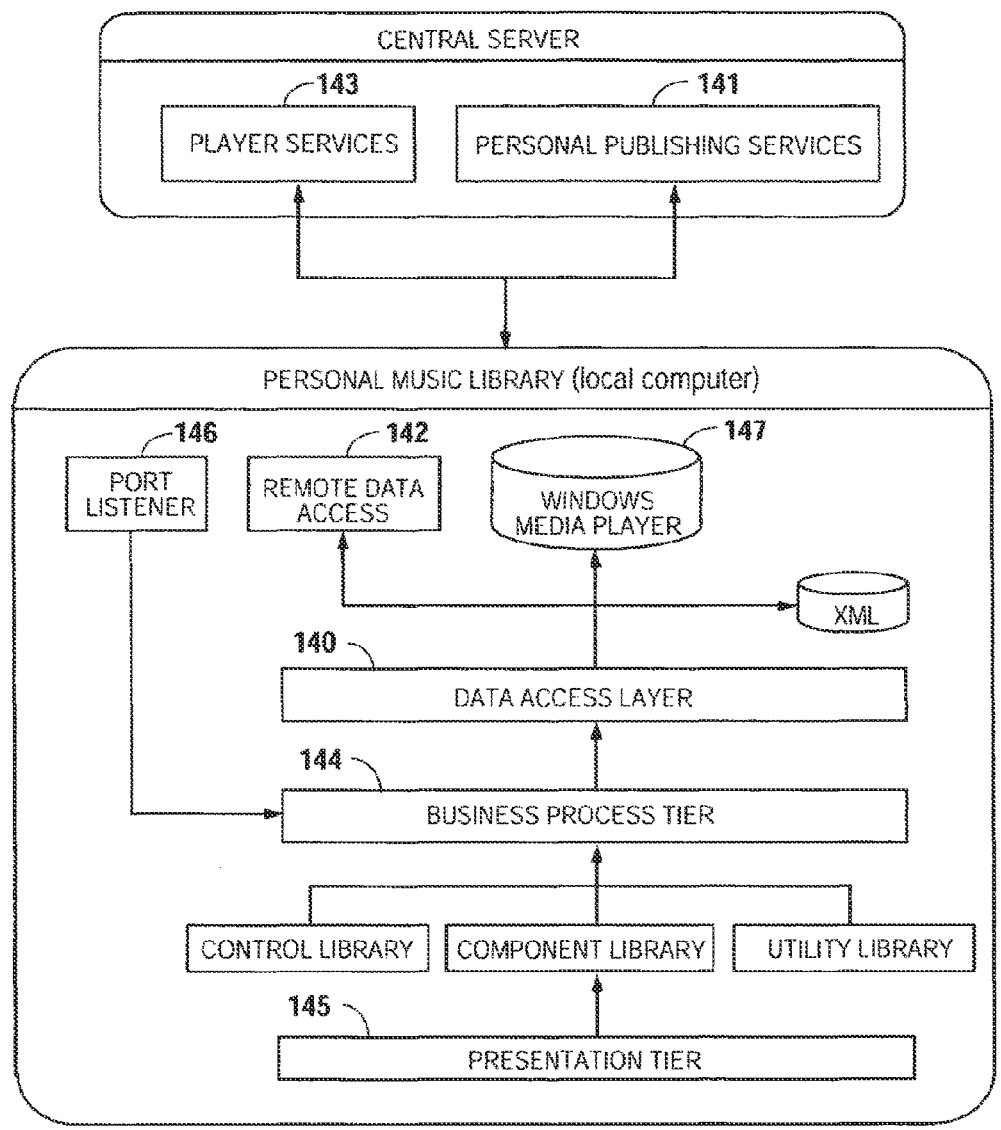
FIG. 22 depicts an exemplary personal media library architecture.

In one embodiment, a personal music library application may have a tiered architecture as illustrated in FIG. 22. In the embodiment of FIG. 22, a data access layer 140 may use Windows Media Player ("WMP") 147, or some other suitable content player or media management application, as its primary content query source. The data access layer 140 may query WMP 147 for audio content currently on, e.g., the user's computer (or other user device). The user may then be allowed to view their library and organize it into playlists and stations. The station and play list information may be stored as XML on the local computer.

In one embodiment, the data access layer 140 may query a personal publishing services component 141 for available perishable content. A user's perishable content preferences may be stored as XML on the local computer. Communication with the personal publishing services component may be provided through a remote data access component 142.

The remote data access component 142 may be used to communicate with a content player services component 143. As discussed above, a content player services component 143 is used to authenticate users and to register the current IP address and port number of the local computer.

A business process tier 144 may be responsible for applying and providing business rules to the data and presentation layer, and may validate and format data along with identifying where data is to be stored.

A presentation tier 145 may be responsible for interacting with a user. The presentation tier 145 may be a Multiple-Document Interface (MDI), i.e., there may be one primary windows form that is responsible for hosting other forms. The presentation tier 145 may communicate primarily with the business process tier 144.

A port listener 146 may be responsible for processing requests from content player services component 143. Content player services 143 may call the port listener 146 when a content player tries to synchronize its content. The first call may be to obtain the player's schedule. Subsequent calls may be to obtain audio content from the local computer.

Although the foregoing specific details describe certain embodiments of this invention, persons of ordinary skill in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. A method of providing a personal media library (PML)-based playlist, the method comprising:
receiving, via an electronic communications network, a preference associated with a listener, the preference indicating a first media preference;
scanning the listener's PML to select media elements included in the listener's PML according to the preference, wherein the listener's PML includes a plurality of media elements organized by a content management application, by executing at least one program instruction;
creating the PML playlist including representations of at least two of the media elements selected as a result of the scanning the listener's PML, by executing at least one program instruction;
synchronizing the PML playlist with a content distribution system configured to publish perishable media content for insertion into the PML playlist; and
providing the PML playlist, including the perishable media content, to the listener via the electronic communications network.

2. The method of claim 1, wherein synchronizing includes reporting played-content history back to the content distribution system.

3. The method of claim 1, wherein perishable content and categorization information are obtained from a publishing server.

4. The method of claim 1, wherein the preference associated with the listener includes at least one of: a preference for perishable content from a particular geographic location and a preference for a perishable content source.

5. The method of claim 1, further comprising:
obtaining a perishable content theme describing a type of perishable content and a frequency at which the type of perishable content is to be played.

6. The method of claim 1, further comprising:
receiving a listener preference for user-generated content including at least one of: DJ-like chatter, a news flash from an organization, a music mashup, a public service announcement and an emergency alert; and
incorporating user-generated content into the playlist according to the listener preference for user-generated content.

7. A computer comprising:
a processor;
memory coupled to the processor; and
the processor configured to:
receive a preference associated with a listener's personal media library (PML), the preference indicating a first media preference;
scan the listener's PML to select media elements included in the listener's PML according to the preference, wherein the listener's PML includes a plurality of media elements organized by a content management application;
create a playlist including representations of at least two of the media elements selected as a result of the scan of the listener's PML;
synchronize the playlist with a content distribution system configured to provide perishable media content for insertion into the playlist; and
provide the playlist, including the perishable media content, to the listener.

8. The computer of claim 7, wherein synchronize the playlist includes interacting with the content distribution system to update perishable media content.

9. The computer of claim 7, wherein the first media preference includes a listener preference for a perishable content theme.

10. The computer of claim 9, wherein the listener preference for perishable content specifies at least one of a geographic location, and a content source.

11. The computer of claim 7, wherein the processor is further configured to:

receive a listener preference for a first media genre, wherein the preference for a first media genre includes an indication of at least one of a media style and a media artist; and create the playlist based, at least in part, on the preference for a first media genre.

12. The computer of claim 7, wherein the processor is further configured to:

receive a listener preference for user-generated content including at least one of: DJ-like chatter, a news flash from an organization, a music mashup, a public service announcement and an emergency alert; and incorporate user-generated content into the playlist according to the listener preference for user-generated content.

13. The computer of claim 7, wherein the processor is further configured to:

receive a listener preference for commercials; and incorporate commercials into the playlist according to the listener preference for commercials.

14. A non-transitory computer readable medium tangibly embodying a program of instructions to be executed by a processor, the program of instructions comprising:

at least one instruction to receive a preference associated with a listener, the preference indicating a first media preference;

at least one instruction to scan a listener's personal media library (PML) to select media elements included in the listener's PML according to the preference, wherein the listener's PML includes a plurality of media elements organized by a content management application;

at least one instruction to create a playlist including representations of at least two of the media elements selected as a result of the scan of the listener's PML;

at least one instruction to synchronize the playlist with a content distribution system via a communications network; and at least one instruction to provide the playlist to the listener.

15. The non-transitory computer readable medium of claim 14, wherein a level of synchronization performed is dependent on at least one of a speed and quality of the communications network.

16. The non-transitory computer readable medium of claim 14, wherein the first media preference includes a listener preference for perishable content including at least one of a news report, sports report, weather report and traffic report.

17. The non-transitory computer readable medium of claim 14, wherein the preference associated with the listener includes a perishable content theme.

18. The non-transitory computer readable medium of claim 14, wherein the program of instructions further comprises:

at least one instruction to receive a listener preference for a first media genre; and at least one instruction to scan the listener's PML to identify media items corresponding to the listener preference for a first media genre.

19. The non-transitory computer readable medium of claim 14, wherein the program of instructions further comprises:

at least one instruction to receive a listener preference for user-generated content from another user to be incorporated into the playlist.

20. The non-transitory computer readable medium of claim 14, wherein the program of instructions further comprises:

at least one instruction to receive a listener preference for commercials; and at least one instruction to incorporate commercials into the playlist according to the listener preference for commercials.

* * * * *